(12) United States Patent
Nagatoshi

(10) Patent No.: US 9,494,776 B2
(45) Date of Patent: Nov. 15, 2016

(54) ZOOM LENS AND IMAGING APPARATUS

(71) Applicant: FUJIFILM Corporation, Tokyo (JP)

(72) Inventor: Yukiko Nagatoshi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/629,924

(22) Filed: Feb. 24, 2015

(65) Prior Publication Data

US 2015/0241674 A1     Aug. 27, 2015

(30) Foreign Application Priority Data

Feb. 26, 2014   (JP) ................................ 2014-034897

(51) Int. Cl.
| | |
|---|---|
| *G02B 15/24* | (2006.01) |
| *G02B 15/22* | (2006.01) |
| *G02B 15/20* | (2006.01) |
| *G02B 15/16* | (2006.01) |
| *G02B 15/167* | (2006.01) |
| *G02B 15/17* | (2006.01) |
| *G02B 15/177* | (2006.01) |
| *G02B 15/14* | (2006.01) |

(52) U.S. Cl.
CPC ............. *G02B 15/24* (2013.01); *G02B 15/14* (2013.01); *G02B 15/16* (2013.01); *G02B 15/167* (2013.01); *G02B 15/17* (2013.01); *G02B 15/177* (2013.01); *G02B 15/20* (2013.01); *G02B 15/22* (2013.01)

(58) Field of Classification Search
CPC ................. G02B 13/009; G02B 15/15; G02B 15/16; G02B 15/20; G02B 15/22; G02B 15/24

USPC .......................... 359/676–679, 683, 686–688
See application file for complete search history.

(56) References Cited

U.S. PATENT DOCUMENTS

| | | |
|---|---|---|
| 3,970,366 A | 7/1976 | Sekiguchi |
| 5,636,060 A | 6/1997 | Suzuki |
| 5,757,554 A * | 5/1998 | Fukami ................ G02B 15/173 359/684 |

(Continued)

FOREIGN PATENT DOCUMENTS

| | | |
|---|---|---|
| DE | 2414029 | 10/1974 |
| JP | 2001-116993 | 4/2001 |

(Continued)

OTHER PUBLICATIONS

German Search Report—10 2015 102 514.0—Oct. 7, 2015.
German Search Report—10 2015 102 513.2—Oct. 7, 2015.

*Primary Examiner* — Darryl J Collins
(74) *Attorney, Agent, or Firm* — Young & Thompson

(57) ABSTRACT

A zoom lens consists essentially of, in order from the object side: a positive first lens group that is fixed during magnification change; a moving lens group consisting of at least two lens groups that are moved along the optical axis direction to change an air space therebetween during magnification change; a stop; and a positive end lens group that is fixed during magnification change. The first lens group consists of, in order from the object side, a negative first lens-group front group, a positive first lens-group middle group, and a positive first lens-group rear group. During focusing, only the first lens-group middle group is moved along the optical axis direction. The first lens-group middle group includes at least one aspheric lens that satisfies predetermined condition expressions.

17 Claims, 13 Drawing Sheets

(56) References Cited

U.S. PATENT DOCUMENTS

| | | | |
|---|---|---|---|
| 5,966,246 A * | 10/1999 | Yoshikawa | G02B 15/173 |
| | | | 359/684 |
| 6,124,982 A * | 9/2000 | Usui | G02B 15/173 |
| | | | 359/676 |
| 6,512,637 B1 | 1/2003 | Tomita | |
| 2009/0046375 A1 | 2/2009 | Wakazono et al. | |
| 2011/0037880 A1 * | 2/2011 | Sakamoto | G02B 15/17 |
| | | | 348/240.3 |

FOREIGN PATENT DOCUMENTS

| | | |
|---|---|---|
| JP | 4478247 | 6/2010 |
| JP | 5241166 | 7/2013 |

\* cited by examiner

FIG.11
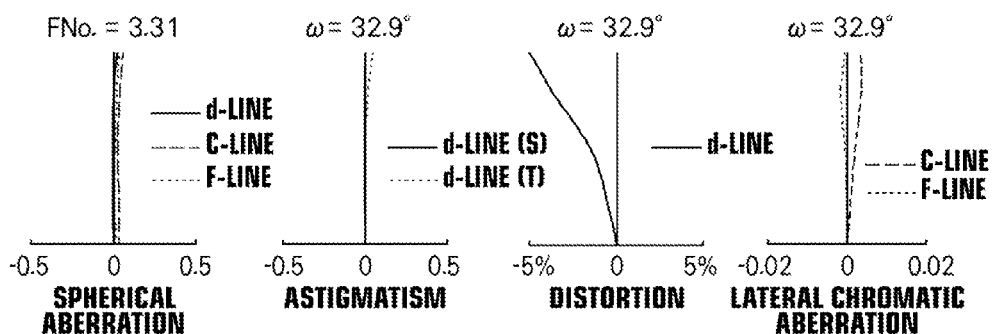
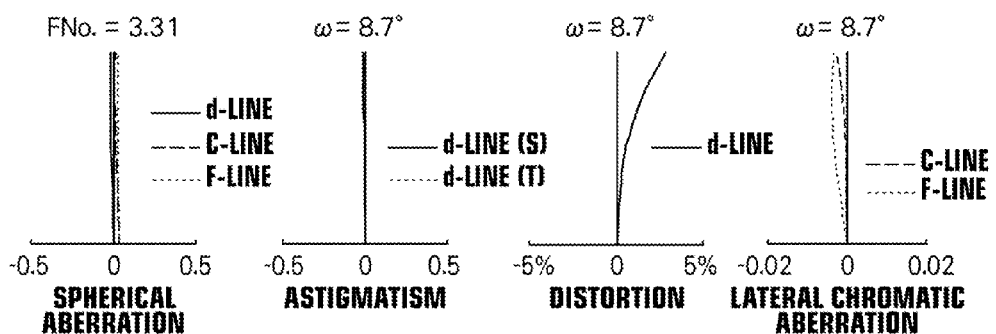
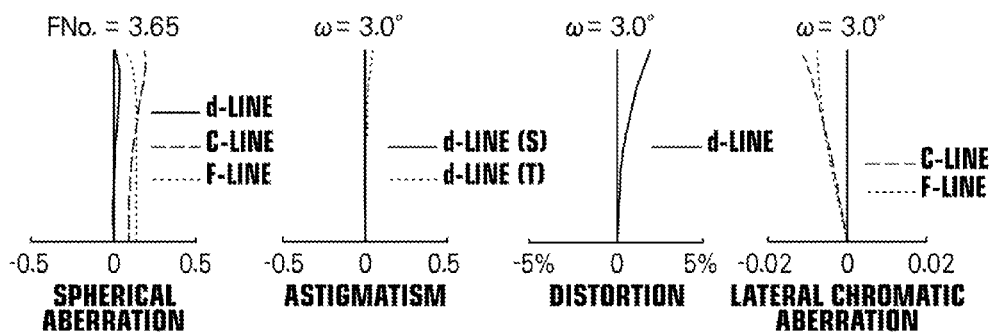

FIG.12
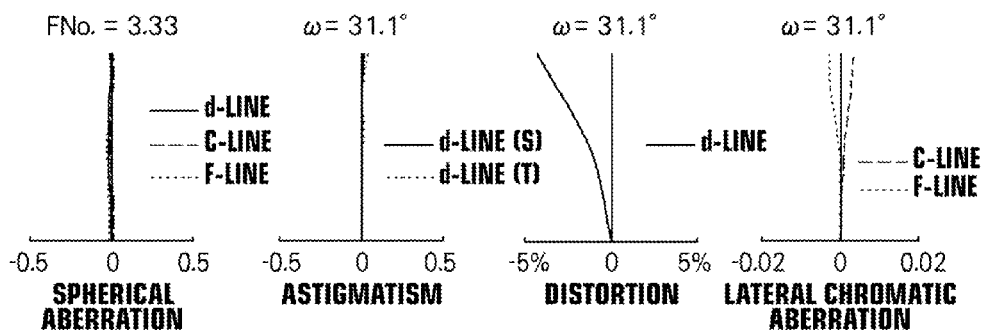
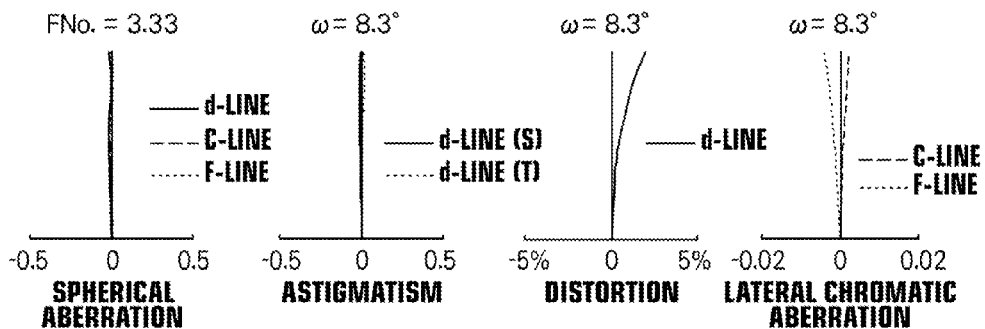
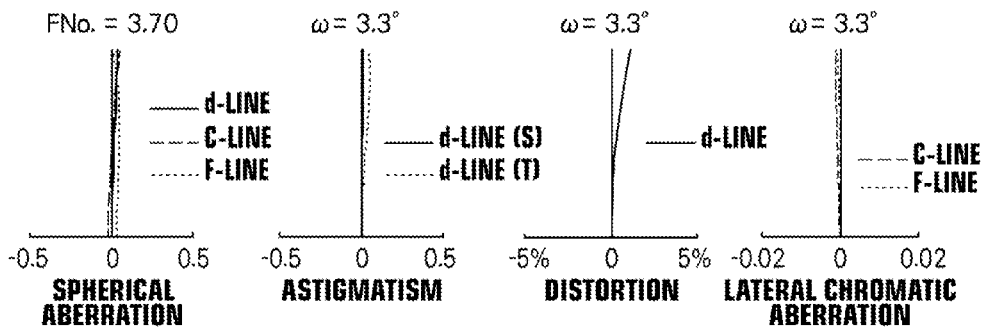

FIG.13
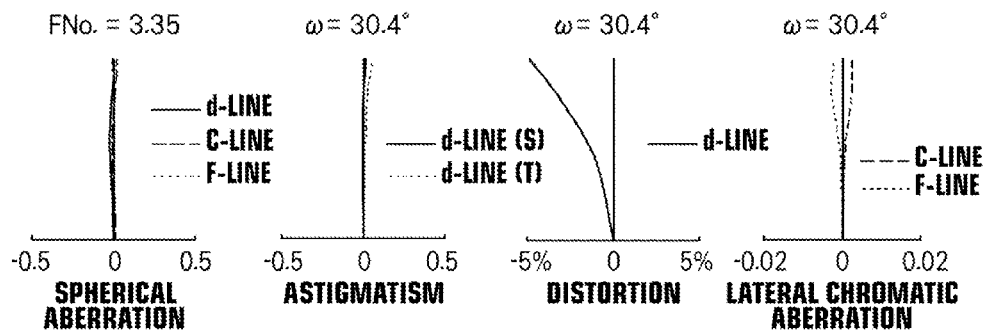
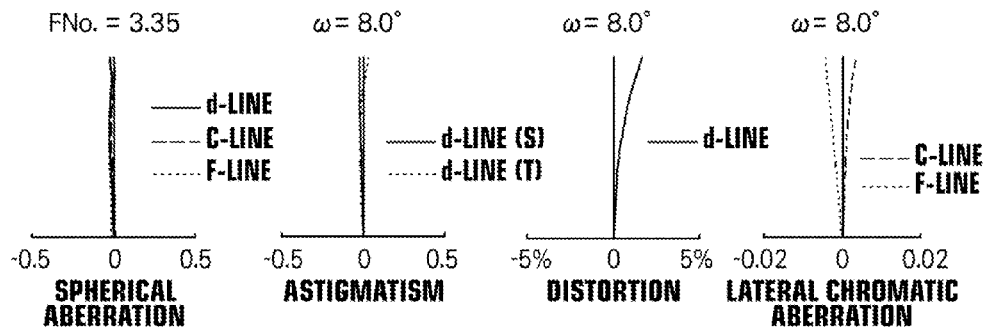
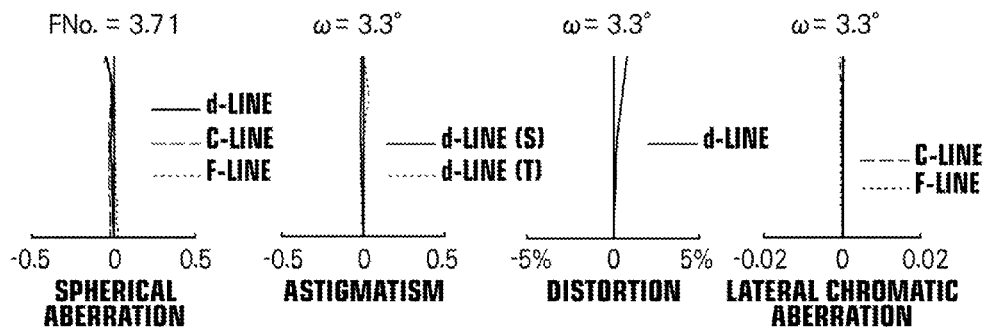

ZOOM LENS AND IMAGING APPARATUS

CROSS-REFERENCE TO RELATED APPLICATIONS

The present application claims priority under 35 U.S.C. §119 to Japanese Patent Application No. 2014-034897, filed on Feb. 26, 2014. The above application is hereby expressly incorporated by reference, in its entirety, into the present application.

BACKGROUND OF THE INVENTION

Field of the Invention

The present invention relates to a zoom lens and an imaging apparatus, and more particularly to a zoom lens that is suitable for use with digital cameras, video cameras, motion-picture cameras, broadcasting cameras, monitoring cameras, etc., and an imaging apparatus provided with the zoom lens.

Description of the Related Art

As a zoom lens mounted on a camera such as a television camera and a broadcasting camera, a four-group zoom lens disclosed in each of Japanese Unexamined Patent Publication No. 2001-116993, and Japanese Patent Nos. 4478247 and 5241166 (hereinafter, Patent Documents 1, 2 and 3, respectively), for example, is known. Each of Patent Documents 1 to 3 teaches a lens system consisting of, in order from the object side, a positive first lens group that is fixed during magnification change, a second lens group that is moved during magnification change, a third lens group having a function to correct for change of the image plane during magnification change, and a positive fourth lens group that is fixed during magnification change.

SUMMARY OF THE INVENTION

Cameras such as motion-picture cameras and broadcasting cameras are desired to have small change of angle of view due to focusing, and such cameras often employ an inner focus system, where the first lens group on the most object side is formed by three lens groups, and only the middle lens group of the three lens groups is moved. The necessity of forming the first lens group by three lens groups and achieving successful correction of aberrations, such as spherical aberration, on the telephoto side tends to result in an increased number of lenses forming the first lens group and an increased size and an increased weight of the first lens group. The mainstream of recent imaging apparatuses is an electronic imaging apparatus employing an image sensor, such as a CCD (Charge Coupled Device) or a CMOS (Complementary Metal Oxide Semiconductor). Along with the recent trend of increasingly higher pixel densities of image sensors, the image sensors have increasingly larger image sizes. Although it is possible to accommodate a large image size by enlarging the lens system, the cameras such as motion-picture cameras and broadcasting cameras are required to be portable, and there is a demand for a lens system that can be configured to be compact and light weight relative to a large image size. The lens systems disclosed in Patent Documents 1 to 3, however, have a very large first lens group when they are configured to accommodate a large image size.

In view of the above-described circumstances, the present invention is directed to providing a zoom lens that can suppress change of angle of view during focusing, is compact and light weight relative to a large image size, and has high optical performance, as well as an imaging apparatus provided with the zoom lens.

The zoom lens of the invention is a zoom lens consisting essentially of, in order from the object side: a first lens group that has a positive refractive power and is fixed relative to an image plane during magnification change; a moving lens group consisting of at least two lens groups that are moved along the optical axis direction to change an air space therebetween during magnification change; a stop; and an end lens group that has a positive refractive power and is fixed relative to the image plane during magnification change, wherein the first lens group consists essentially of, in order from the object side, a first lens-group front group that has a negative refractive power and is fixed relative to the image plane during focusing, a first lens-group middle group that has a positive refractive power and is moved along the optical axis direction during focusing, and a first lens-group rear group that has a positive refractive power and is fixed relative to the image plane during focusing, the first lens-group middle group includes at least one aspheric lens that satisfies the condition expression (1) below, and at least one aspheric surface of the aspheric lens satisfies the condition expression (2) below:

$$0 < [Xr(yr) - Xf(yf)]/fw \quad (1),$$

and $$30 < Das \cdot y/IH^2 < 100 \quad (2),$$

where yf is a height on the object-side surface of the aspheric lens of a principal ray at a maximum image height at the wide-angle end, yr is a height on the image-side surface of the aspheric lens of the principal ray at the maximum image height at the wide-angle end, Xf(yf) is a positional difference in the optical axis direction between the object-side surface of the aspheric lens and a paraxial spherical surface of the object-side surface at the height yf, Xr(yr) is a positional difference in the optical axis direction between the image-side surface of the aspheric lens and a paraxial spherical surface of the image-side surface at the height yr, fw is a focal length of the entire system at the wide-angle end, Das is a distance along the optical axis from the aspheric surface of the aspheric lens to the aperture stop, y is a height on the aspheric surface of the aspheric lens of the principal ray at the maximum image height at the wide-angle end, and IH is the maximum image height, where a negative Xf(yf) indicates that the object-side surface of the aspheric lens at the height yf is on the object side of the paraxial spherical surface of the object-side surface, and a positive Xf(yf) indicates that the object-side surface of the aspheric lens at the height yf is on the image side of the paraxial spherical surface of the object-side surface, and where a negative Xr(yr) indicates that the image-side surface of the aspheric lens at the height yr is on the object side of the paraxial spherical surface of the image-side surface, and a positive Xr(yr) indicates that the image-side surface of the aspheric lens at the height yr is on the image side of the paraxial spherical surface of the image-side surface.

It is preferred that the zoom lens of the invention satisfy one of or any combination of the condition expressions (3) to (5), (8), (1-1), (2-1), (4-1), and (5-1) below:

$$0.002 < [Xr(yr) - Xf(yf)]/fw < 0.05 \quad (1\text{-}1),$$

$$40 < Das \cdot y/IH^2 < 80 \quad (2\text{-}1),$$

$$Das/(IH \cdot Zr) < 2 \quad (3),$$

$$3 \leq flb/fw < 30 \qquad (4),$$

$$5 \leq flb/fw < 15 \qquad (4\text{-}1),$$

$$2 \leq fl/fw < 15 \qquad (5),$$

$$3 \leq fl/fw < 8 \qquad (5\text{-}1),$$

and $$-6 < fla/fw < -3 \qquad (8),$$

where Zr is a zoom ratio, flb is a focal length of the first lens-group middle group, fl is a focal length of the first lens group, and fla is a focal length of the first lens-group front group.

It is preferred that, in the zoom lens of the invention, the first lens-group front group consist essentially of, in order from the object side, a negative lens, and a cemented lens formed by a negative lens and a positive lens that are cemented together in this order from the object side, and the condition expressions (6) and (7) below be satisfied, and it is more preferred that the condition expressions (6-1) and (7-1) below be satisfied:

$$1.7 < Nd(1a-) \qquad (6),$$

$$1.75 < Nd(1a-) \qquad (6\text{-}1),$$

$$vd(1a+) < 28 \qquad (7),$$

$$vd(1a+) < 25 \qquad (7\text{-}1),$$

where Nd(1a−) is an average refractive index with respect to the d-line of the negative lenses of the first lens-group front group, and vd(1a+) is an Abbe number with respect to the d-line of the positive lens of the first lens-group front group.

It is preferred that, in the zoom lens of the invention, the first lens-group middle group have a three-lens configuration consisting essentially of, in order from the object side, a positive lens, a negative lens, and a positive lens, or a four-lens configuration consisting essentially of, in order from the object side, two positive lenses, a negative lens, and a positive lens.

It is preferred that, in the zoom lens of the invention, each of first and second lens groups from the image side among the lens groups forming the moving lens group have a negative refractive power.

It is preferred that, in the zoom lens of the invention, the first lens-group middle group consist of two lens groups that are moved along the optical axis direction to change an air space therebetween during focusing.

The imaging apparatus of the invention comprises the above-described zoom lens of the invention.

The "lens group" as used herein may not necessarily be formed by a plurality of lenses, and may include a lens group formed by one lens.

It should be noted that the expression "consisting/consist essentially of" as used herein means that the zoom lens may include, besides the elements recited above, lenses substantially without any power, and optical elements other than lenses, such as a stop, a cover glass, and filters.

The sign (positive or negative) with respect to the refractive power and the surface shape of any lens including an aspheric surface described herein are about the paraxial region.

The lens system according to the invention consists of, in order from the object side, a positive fixed group, a moving group consisting of a plurality of lens groups, and a positive fixed group, wherein the most object-side positive fixed group consists of three lens groups and only the middle lens group among the three lens groups functions as a focus group, which includes an aspheric surface that satisfies the predetermined condition expressions. This lens system can provide a zoom lens that can suppress change of angle of view during focusing, is compact and light weight relative to a large image size, and has high optical performance, as well as an imaging apparatus provided with the above-described zoom lens.

BRIEF DESCRIPTION OF THE DRAWINGS

FIG. 11 shows aberration diagrams of the zoom lens of Example 3 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom, FIG. 12 shows aberration diagrams of the zoom lens of Example 4 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom, FIG. 13 shows aberration diagrams of the zoom lens of Example 5 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

DESCRIPTION OF THE PREFERRED EMBODIMENTS

Figure 1:
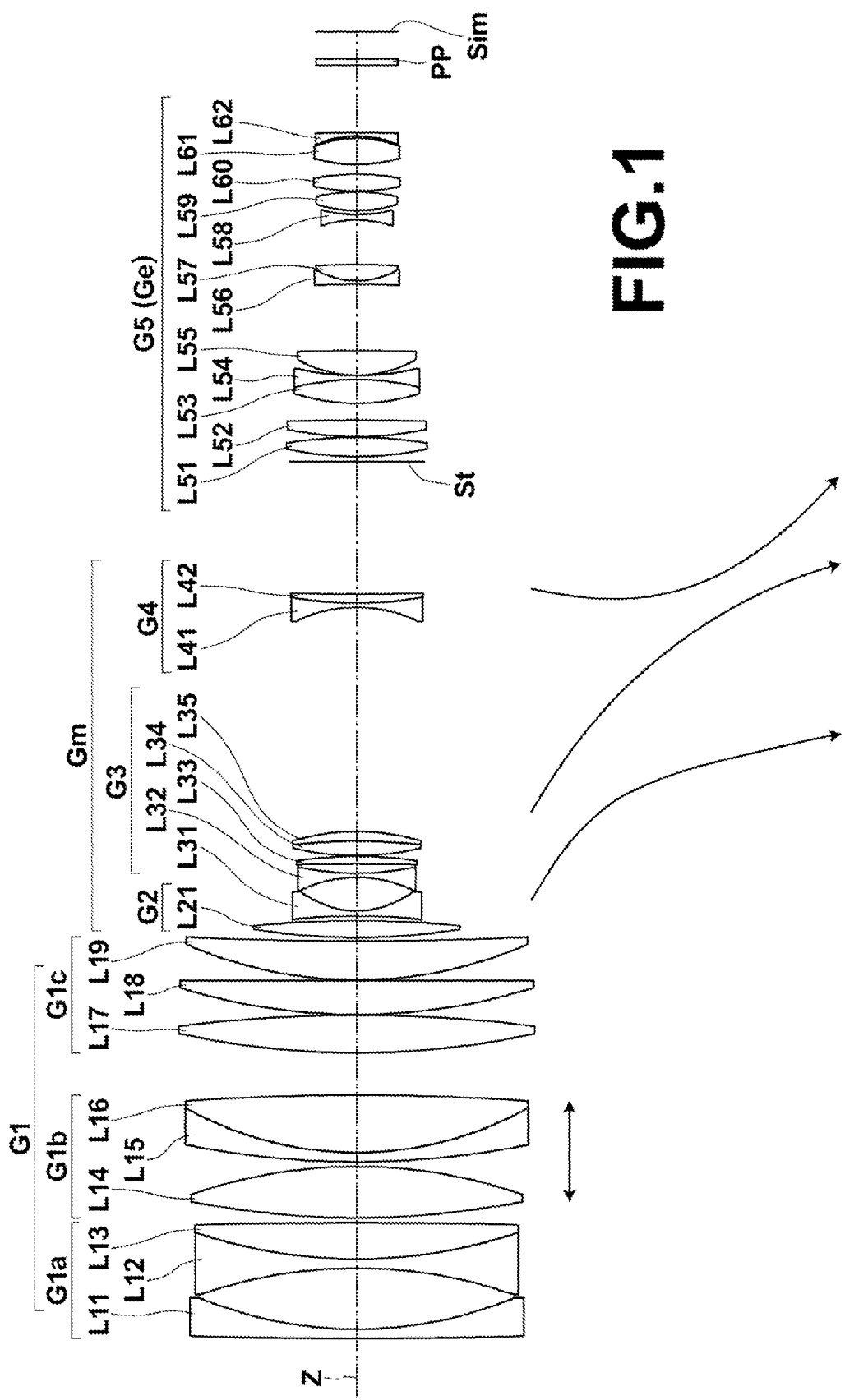
FIG. 1 is a sectional view illustrating the lens configuration at the wide-angle end of a zoom lens according to one embodiment of the invention.

Hereinafter, embodiments of the present invention will be described in detail with reference to the drawings. FIG. 1 is a sectional view illustrating the lens configuration at the wide-angle end of a zoom lens according to one embodiment of the invention when the zoom lens is focused on an object at infinity. The example shown in FIG. 1 corresponds to Example 1, which will be described later. On FIG. 1, the left side is the object side, and the right side is the image side.

When this zoom lens is mounted on an imaging apparatus, it is preferred to provide a protective cover glass, and various filters, such as a low-pass filter and an infrared cut-off filter, depending on the specifications of the imaging apparatus. In the example shown in FIG. 1, an optical member PP in the form of a parallel plate, which is assumed to represent such elements, is disposed between the lens system and the image plane Sim.

The zoom lens of the invention consists essentially of, in order from the object side along the optical axis Z: a first lens group G1 that has a positive refractive power and is fixed relative to the image plane Sim during magnification change; a moving lens group Gm consisting of at least two lens groups that are moved along the optical axis direction to change an air space therebetween during magnification change; an aperture stop St; and an end lens group Ge that has a positive refractive power and is fixed relative to the image plane Sim during magnification change. It should be noted that the aperture stop St shown in FIG. 1 does not necessarily represent the size and the shape thereof, but represents the position thereof along the optical axis.

The zoom lens shown in FIG. 1 consists of, in order from the object side along the optical axis Z, a first lens group G1 having a positive refractive power, a second lens group G2 having a positive refractive power, a third lens group G3 having a negative refractive power, a fourth lens group G4 having a negative refractive power, an aperture stop St, and a fifth lens group G5 having a positive refractive power. During magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change air spaces between one another. In the example shown in FIG. 1, the lens group consisting of the second lens group G2, the third lens group G3, and the fourth lens group G4 corresponds to the moving lens group Gm, and the fifth lens group G5 corresponds to the end lens group Ge.

The curved arrows shown in FIG. 1 below the second lens group G2, the third lens group G3, and the fourth lens group G4, respectively, schematically show movement loci of the corresponding lens groups that are moved during magnification change from the wide-angle end to the telephoto end. In the example shown in FIG. 1, during magnification change from the wide-angle end to the telephoto end, the second lens group G2 is always moved toward the image side and is not moved toward the object side, the third lens group G3 is also always moved toward the image side and is not moved toward the object side, and the fourth lens group G4 is once moved toward the object side and then is moved toward the image side.

In the example shown in FIG. 1, the first lens group G1 consists of nine lenses, i.e., lenses L11 to L19 in this order from the object side, the second lens group G2 consists of one lens, i.e., lens L21, the third lens group G3 consists of five lenses, i.e., lenses L31 to L35 in this order from the object side, the fourth lens group G4 consists of two lenses, i.e., lenses L41 to L42 in this order from the object side, and the fifth lens group G5 consists of twelve lenses, i.e., lenses L51 to L62 in this order from the object side.

In this zoom lens, forming the most object-side first lens group G1 by a positive lens group allows reduction of the entire length of the lens system and thus is advantageous for size reduction. Further, forming the most image-side fifth lens group G5 by a positive lens group allows suppressing increase of the incidence angle of the principal ray of off-axis rays on the image plane Sim, and this allows suppressing shading. Since the most object-side lens group and the most image-side lens group are fixed during magnification change, the entire length of the lens system does not change during magnification change. The above-described configuration, which consists of, in order from the object side, the positive fixed group, the moving group consisting of a plurality of lens groups that are moved to change distances between one another, the aperture stop St, and the positive fixed group, can provide a compact and high performance zoom lens that is highly convenient and is preferably usable, in particular, with motion-picture cameras and broadcasting cameras.

It is preferred that, among the plurality of lens groups forming the moving lens group Gm, each of the first and second lens groups from the image side have a negative refractive power. In this case, the entire length of the lens system can be suppressed. If the first and second lens groups from the image side of the moving lens group are formed by a positive lens group and a negative lens group, respectively, the negative lens group is moved toward the image side and the positive lens group is moved toward the object side during magnification change from the wide-angle end to the telephoto end, and this requires a long space for the movement of the lens groups, resulting in size increase of the lens system.

The moving lens group Gm may have, for example, a two-group configuration where two negative lens groups are moved to change an air space therebetween. This configuration allows forming the moving lens group Gm by a minimum number of lens groups and simplifying the drive mechanism, thereby achieving size reduction of the apparatus. Alternatively, the moving lens group Gm may have a three-group configuration where three negative lens groups are moved to change air spaces between one another. This configuration is more advantageous in suppressing change of aberrations during magnification change than the two-group configuration.

Still alternatively, the moving lens group Gm may have a three-group configuration where a positive lens group, a negative lens group, and a negative lens group arranged in this order from the object side are moved to change air spaces between one another. This configuration allows suppressing the effective diameter of the first lens group G1 at the telephoto side and suppressing the outside diameter of the first lens group G1, thereby achieving size reduction and the weight reduction. This configuration also allows suppressing change of spherical aberration during magnification change, thereby allowing maintaining good performance during magnification change while achieving a high magnification lens system.

The most image-side negative lens group of the moving lens group Gm may be formed, for example, by a cemented lens formed by a negative lens and a positive lens that are cemented together in this order from the object side. Disposing the above-described cemented lens in the vicinity of the aperture stop St is advantageous in suppressing change of chromatic aberration during magnification change.

The first lens group G1 of this zoom lens consists essentially of three lens groups consisting of, in order from the object side, a first lens-group front group G1a having a negative refractive power, a first lens-group middle group G1b having a positive refractive power, and a first lens-group rear group G1c having a positive refractive power. During focusing from an object at infinity to a close object, the first lens-group front group G1a and the first lens-group rear group G1c are fixed relative to the image plane Sim, and only the first lens-group middle group G1b is moved along the optical axis direction. This configuration allows suppressing change of aberrations and change of angle of view during focusing. In FIG. 1, the straight arrow in the horizontal direction is shown below the first lens-group middle group G1b to denote that the first lens-group middle group G1b is a focus group.

In the example shown in FIG. 1, the first lens-group front group G1a consists of lenses L11 to L13 in this order from the object side, the first lens-group middle group G1b consists of lenses L14 to L16 in this order from the object side, and the first lens-group rear group G1c consists of lenses L17 to L19 in this order from the object side.

It is preferred that the first lens-group front group G1a consist essentially of, in order from the object side, a negative lens, and a cemented lens formed by a negative lens and a positive lens that are cemented together in this order from the object side. This configuration allows suppressing field curvature and distortion at the wide-angle side, and successful correction of spherical aberration at the telephoto side.

It is preferred that the first lens-group middle group G1b have a three-lens configuration consisting essentially of a positive lens, a negative lens, and a positive lens in this order from the object side, or a four-lens configuration consisting essentially of two positive lenses, a negative lens, and a positive lens in this order from the object side. This configuration allows suppressing change of performance during focusing.

In the example shown in FIG. 1, the three lenses L14 to L16 are moved together during focusing. However, a so-called floating focus system may be employed, where the first lens-group middle group G1b consists of two lens groups and the two lens groups are moved to change an air space therebetween during focusing. In the case where the floating focus system is employed, change of spherical aberration at the telephoto side during focusing can be suppressed.

In this zoom lens, the first lens-group middle group G1b includes at least one aspheric lens that satisfies the condition expression (1) below, and at least one aspheric surface of the aspheric lens satisfies the condition expression (2) below.

Using the above-described aspheric surface in the first lens-group middle group G1b allows designing a compact and light weight first lens group G1 relative to a large image size, and suppressing change of performance during focusing.

$$0<[Xr(yr)-Xf(yf)]/fw \quad (1),$$

and $$30<Das \cdot y/IH^2<100 \quad (2),$$

where yf is a height on the object-side surface of the aspheric lens of a principal ray at the maximum image height at the wide-angle end, yr is a height on the image-side surface of the aspheric lens of the principal ray at the maximum image height at the wide-angle end, Xf(yf) is a positional difference in the optical axis direction between the object-side surface of the aspheric lens and a paraxial spherical surface of the object-side surface at the height yf, Xr(yr) is a positional difference in the optical axis direction between the image-side surface of the aspheric lens and a paraxial spherical surface of the image-side surface at the height yr, fw is a focal length of the entire system at the wide-angle end, Das is a distance along the optical axis from the aspheric surface of the aspheric lens to the aperture stop, y is a height on the aspheric surface of the aspheric lens of the principal ray at the maximum image height at the wide-angle end, and IH is the maximum image height.

Further, a negative Xf(yf) indicates that the object-side surface of the aspheric lens at the height yf is on the object side of the paraxial spherical surface of the object-side surface, and a positive Xf(yf) indicates that the object-side surface of the aspheric lens at the height yf is on the image side of the paraxial spherical surface of the object-side surface. Similarly, a negative Xr(yr) indicates that the image-side surface of the aspheric lens at the height yr is on the object side of the paraxial spherical surface of the image-side surface, and a positive Xr(yr) indicates that the image-side surface of the aspheric lens at the height yr is on the image side of the paraxial spherical surface of the image-side surface. The "height" refers to a distance from the optical axis Z in the radial direction.

It should be noted that the y is equal to the yf when the y is about the aspheric surface on the object side, and is equal to the yr when the y is about the aspheric surface on the image side. For example, in the example shown in FIG. 1, the lens L14 is the only aspheric lens included in the first lens-group middle group G1b. Since the object-side surface of the lens L14 is an aspheric surface and the image-side surface of the lens L14 is a spherical surface, y=yf in the example shown in FIG. 1.

Figure 2:
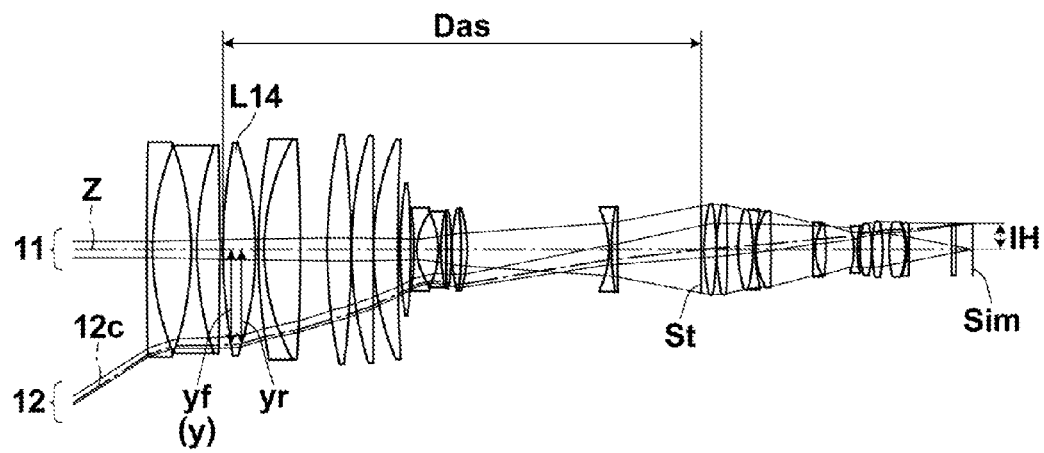
FIG. 2 is a diagram for explaining symbols used in condition expressions (1) and (2)

FIG. 2 is a sectional view showing an axial bundle of rays 11, a bundle of rays 12 at the maximum image height, and a principal ray 12c at the maximum image height together with the zoom lens of the example shown in FIG. 1, to show examples of the heights yf, yr, and y, the distance Das, and the maximum image height IH relating to the condition expressions (1) and (2). It should be noted that, in FIG. 2, symbols denoting the lenses and the lens groups other than the lens L14 are omitted for the sake of simplicity of the drawing.

Figure 3:
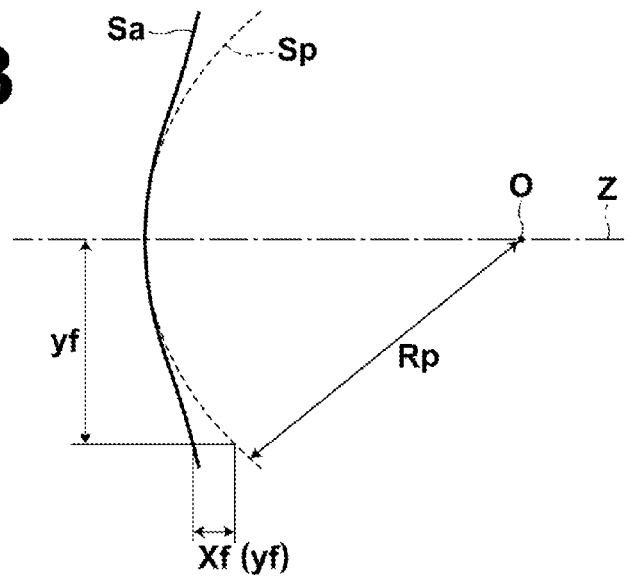
FIG. 3 is a diagram for explaining Xf(yf)

FIG. 3 is a conceptual diagram for explaining the Xf(yf) in the case where the object-side surface is an aspheric surface. As shown in FIG. 3, the Xf(yf) is a positional difference in the optical axis direction between the object-side surface Sa of the aspheric lens and a paraxial spherical surface Sp of the surface Sa at the height yf. The paraxial spherical surface Sp of the surface Sa is a spherical surface having a radius that is equal to a paraxial radius of curvature Rp of the surface Sa, and passing through the intersection point between the surface Sa and the optical axis Z. FIG. 3 also shows the center O of the paraxial spherical surface Sp. The Xr(yr) can be explained in the same manner with respect to the image-side surface. With respect to the lens L14 in the example shown in FIG. 1, the image-side surface is a spherical surface, and therefore the value of the Xr(yr) is 0.

Configuring the zoom lens to satisfy the lower limit of the condition expression (1) facilitates suppressing change of performance during focusing. Further, it is preferred that the condition expression (1-1) below be satisfied:

$$0.002<[Xr(yr)-Xf(yf)]/fw<0.05 \qquad (1\text{-}1).$$

When the lower limit of the condition expression (1-1) is satisfied, the above-described effect with respect to the condition expression (1) can be enhanced. Configuring the zoom lens to satisfy the upper limit of the condition expression (1-1) allows well-balanced successful correction of aberrations, such as spherical aberration, distortion, and astigmatism.

Configuring the zoom lens to satisfy the lower limit of the condition expression (2) facilitates successful correction of distortion and astigmatism. Configuring the zoom lens to satisfy the upper limit of the condition expression (2) facilitates size reduction relative to a large image size, and allows successful correction of spherical aberration at the telephoto side. In order to enhance the above-described effects with respect to the condition expression (2), it is more preferred that the condition expression below (2-1) be satisfied:

$$40<Das\cdot y/IH^2<80 \qquad (2\text{-}1).$$

The aspheric lens that satisfies the condition expression (1) may be a positive lens or a negative lens. The aspheric surface that satisfies the condition expression (2) may be the object-side surface or the image-side surface. However, at the wide-angle side, the ray height on the object-side surface of a marginal ray traveling through the first lens-group middle group G1b is higher than the ray height on the image-side surface, and therefore, in a case where only one of the object-side surface and the image-side surface is the aspheric surface that satisfies the condition expression (2), more effective correction of off-axis aberrations can be achieved when the object-side surface is the aspheric surface. The aspheric surface that satisfies the condition expression (2) may be a convex surface or a concave surface. However, if the aspheric surface is a concave surface, the marginal area of the lens tends to have a shape that provides a stronger power than that of the central area of the lens, and this may result in excessive correction. In contrast, if the aspheric surface is a convex surface, the marginal area of the lens tends to have a shape that provides a weaker power than that of the central area of the lens, and this allows suppressing aberrations and facilitates balancing among the aberrations.

It is preferred that the zoom lens satisfy the condition expression (3) below:

$$Das/(IH\cdot Zr)<2 \qquad (3),$$

where Das is a distance along the optical axis from the aspheric surface of the aspheric lens to the aperture stop, IH is the maximum image height, and Zr is a zoom ratio.

Configuring the zoom lens to satisfy the upper limit of the condition expression (3) allows size reduction of the first lens group G1 while ensuring a zoom ratio of around 10×, for example, desired for cameras such as motion-picture cameras and broadcasting cameras.

It is preferred that the zoom lens satisfy the condition expression (4) below:

$$3<flb/fw<30 \qquad (4),$$

where flb is a focal length of the first lens-group middle group, and fw is a focal length of the entire system at the wide-angle end.

Setting the refractive power of the first lens-group middle group G1b to satisfy the lower limit of the condition expression (4) allows suppressing change of aberrations during focusing. Setting the refractive power of the first lens-group middle group G1b to satisfy the upper limit of the condition expression (4) allows preventing increase of the amount of movement of the first lens-group middle group G1b during focusing, thereby preventing size increase of the first lens group G1. In order to enhance the above-described effects with respect to the condition expression (4), it is more preferred that the condition expression (4-1) below be satisfied:

$$5<flb/fw<15 \qquad (4\text{-}1).$$

It is preferred that the zoom lens satisfy the condition expression (5) below:

$$2<fl/fw<15 \qquad (5),$$

where fl is a focal length of the first lens group, and fw is a focal length of the entire system at the wide-angle end.

Setting the refractive power of the first lens group G1 to satisfy the lower limit of the condition expression (5) allows avoiding the positive refractive power from becoming excessively strong, and this facilitates successful correction of spherical aberration. Setting the refractive power of the first lens group G1 to satisfy the upper limit of the condition expression (5) allows avoiding the positive refractive power from becoming excessively weak, and this allows suppressing increase of the diameter of the first lens group G1. In order to enhance the above-described effects with respect to the condition expression (5), it is more preferred that the condition expression (5-1) below be satisfied:

$$3<fl/fw<8 \qquad (5\text{-}1).$$

In the case where the first lens-group front group G1a of the zoom lens consists essentially of, in order from the object side, a negative lens, and a cemented lens formed by a negative lens and a positive lens that are cemented together in this order from the object side, it is preferred that the condition expressions (6) and (7) below be satisfied:

$$1.7<Nd(1a-) \qquad (6),$$

and $$vd(1a+)<28 \qquad (7),$$

where Nd(1a−) is an average refractive index with respect to the d-line of the negative lenses of the first lens-group front group, and vd(1a+) is an Abbe number with respect to the d-line of the positive lens of the first lens-group front group.

Selecting the materials to satisfy the lower limit of the condition expression (6) allows successful correction of distortion and field curvature. In order to enhance the above-described effects with respect to the condition expression (6), it is more preferred that the condition expression (6-1) below be satisfied:

$$1.75<Nd(1a-) \qquad (6\text{-}1).$$

Selecting the materials to satisfy the upper limit of the condition expression (7) allows successful correction of lateral chromatic aberration. In order to enhance the above-described effect with respect to the condition expression (7), it is more preferred that the condition expression (7-1) below be satisfied:

$$\nu d(1a+)<25 \tag{7-1}.$$

It is preferred that the zoom lens satisfy the condition expression (8) below:

$$-6<f1a/fw<-3 \tag{8},$$

where f1a is a focal length of the first lens-group front group, and fw is a focal length of the entire system at the wide-angle end.

Setting the negative refractive power of the first lens-group front group G1a to satisfy the lower limit of the condition expression (8) allows ensuring the positive refractive power of the first lens-group middle group G1b, and this allows avoiding the space for focusing from an object at infinity to a close object from becoming excessively large. Further, setting the negative refractive power of the first lens-group front group G1a to satisfy the lower limit of the condition expression (8) allowing suppressing increase of the lens diameters of the first lens-group front group G1a and the first lens-group middle group G1b. Setting the refractive power of the first lens-group front group G1a to satisfy the upper limit of the condition expression (8) allows suppressing distortion at the wide-angle side and spherical aberration at the telephoto side.

The zoom lens according to the above-described embodiment is preferably applicable to a lens system having a zoom ratio of around 10×, for example. The number of lenses and the shapes of the lenses forming each lens group of the zoom lens of the invention are not limited to those in the example shown in FIG. 1, and lenses of different numbers and shapes may be used to form each lens group. Further, the above-described preferred configurations and possible configurations can be combined in any manner, and it is preferred that the above-described configurations be selectively adopted, as appropriate, depending on required specifications of the zoom lens.

Next, specific numerical examples of the zoom lens of the invention are described. Examples 1 to 5 shown below are normalized such that the focal length of the entire system at the wide-angle end in each example becomes 10.00.

Example 1

Figure 4:
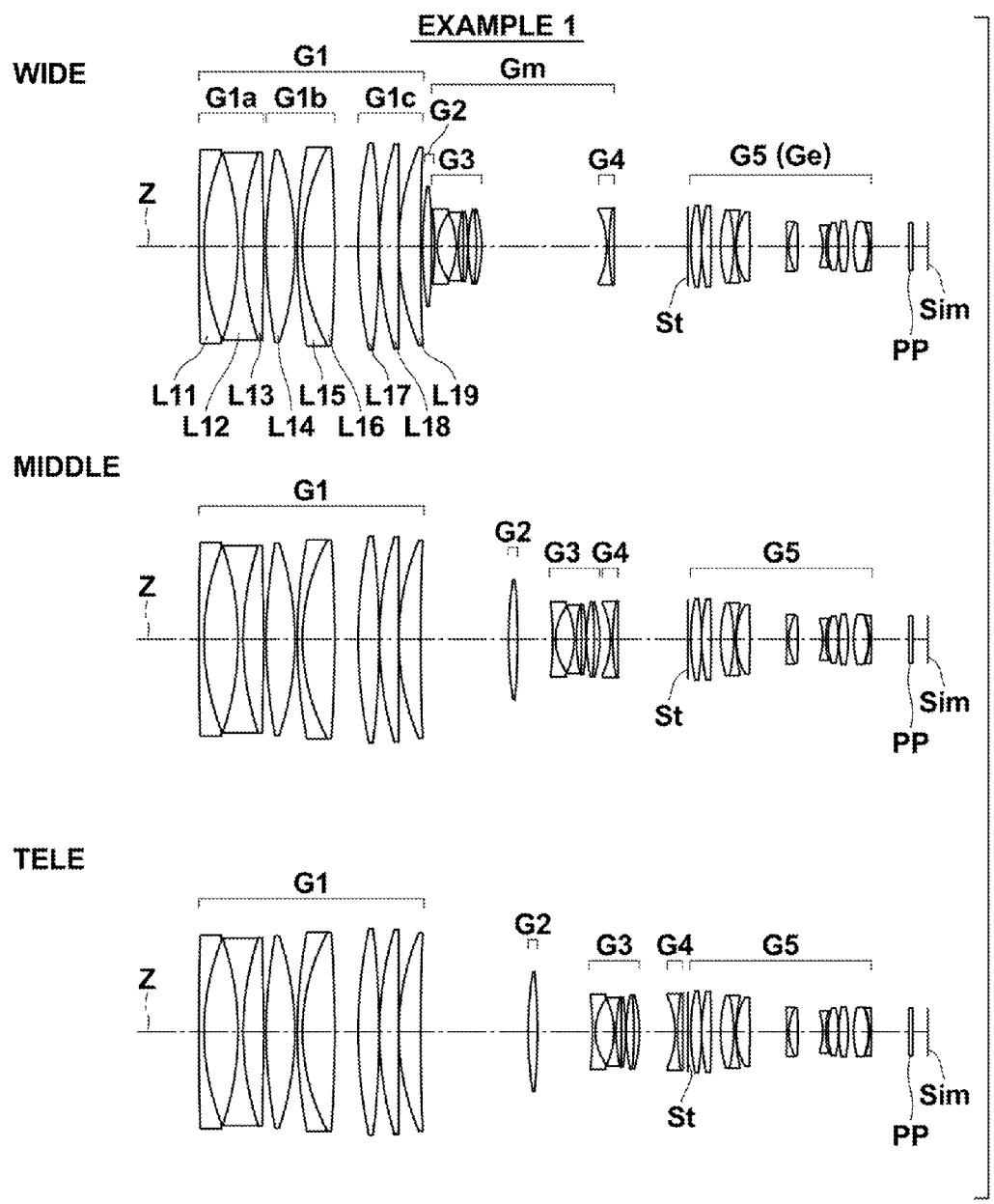
FIG. 4 is a sectional view illustrating the lens configuration of a zoom lens of Example 1 of the invention, where the state at the wide-angle end is shown at the top, the state at the middle focal length is shown at the middle, and the state at the telephoto end is shown at the bottom.

FIG. 4 is a sectional view illustrating the lens configuration of a zoom lens of Example 1 when the zoom lens is focused on an object at infinity. In FIG. 4, the state at the wide-angle end is shown at the top denoted by the text "WIDE", the state at the middle focal length is shown at the middle denoted by the text "MIDDLE", and the state at the telephoto end is shown at the bottom denoted by the text "TELE". On FIG. 4, the left side is the object side, and the right side is the image side.

The schematic configuration of the zoom lens of Example 1 is as follows. The zoom lens of Example 1 consists essentially of five lens groups consisting of, in order from the object side, a first lens group G1 having a positive refractive power, a second lens group G2 having a positive refractive power, a third lens group G3 having a negative refractive power, a fourth lens group G4 having a negative refractive power, an aperture stop St, and a fifth lens group G5 having a positive refractive power. During magnification change from the wide-angle end to the telephoto end, the first lens group G1 and the fifth lens group G5 are fixed relative to the image plane Sim, and the second lens group G2, the third lens group G3, and the fourth lens group G4 are moved along the optical axis direction to change air spaces between one another. That is, the lens group formed by the second lens group G2, the third lens group G3, and the fourth lens group G4 corresponds to the moving lens group Gm, and the fifth lens group G5 corresponds to the end lens group Ge. The first lens group G1 consists essentially of three lens groups consisting of, in order from the object side, a first lens-group front group G1a having a negative refractive power, a first lens-group middle group G1b having a positive refractive power, and a first lens-group rear group G1c having a positive refractive power. During focusing from an object at infinity to a close object, the first lens-group front group G1a and the first lens-group rear group G1c are fixed relative to the image plane Sim, and only the first lens-group middle group G1b is moved along the optical axis direction. The first lens-group front group G1a consists of lenses L11 to L13 in this order from the object side, the first lens-group middle group G1b consists of lenses L14 to L16 in this order from the object side, and the first lens-group rear group G1c consists of lenses L17 to L19 in this order from the object side. The lens L14 is the only aspheric lens included in the first lens-group middle group G1b, where the object-side surface of the lens L14 is an aspheric surface, and the image-side surface of the lens L14 is a spherical surface.

As the detailed configuration of the zoom lens of Example 1, Table 1 shows basic lens data, Table 2 shows specifications with respect to the d-line and variable surface distances, and Table 3 shows aspheric coefficients. The numerical values shown in the tables below are rounded at predetermined decimal places.

In Table 1, each value in the column of "Si" represents the surface number of the i-th (i=1, 2, 3, . . . ) surface, where the object-side surface of the most object side element is the 1st surface and the number is sequentially incremented toward the image side, each value in the column of "Ri" represents the radius of curvature of the i-th surface, and each value in the column of "Di" represents the surface distance between the i-th surface and the i+1-th surface along the optical axis Z. It should be noted that the lowermost numerical value shown in the column of "Di" is the surface distance between the most image-side surface shown in Table 1 and the image plane Sim along the optical axis Z. Further, in Table 1, each value in the column of "Ndj" represents the refractive index with respect to the d-line (the wavelength of 587.56 nm) of the j-th (j=1, 2, 3, . . . ) element, where the most object-side element is the 1st element and the number is sequentially incremented toward the image side, and each value in the column of "νdj" represents the Abbe number with respect to the d-line of the j-th element.

The sign with respect to the radius of curvature shown in Table 1 is provided such that a positive radius of curvature indicates a surface shape that is convex toward the object side, and a negative radius of curvature indicates a surface shape that is convex toward the image side. Table 1 also shows the aperture stop St and the optical member PP, and the surface number and the text "(St)" are shown at the position in the column of the surface number corresponding to the aperture stop St.

With respect to the surface distances that are changed during focusing, Table 1 shows a value of each surface distance when the zoom lens is focused on an object at infinity and the text "(MO)" following each value. Further, in Table 1, the value of each surface distance that is changed during magnification change is represented by the symbol "DD[ ]", where the surface number of the object-side surface corresponding to each surface distance is shown within "[ ]". Specifically, DD[16], DD[18], DD[27], and DD[30] shown in Table 1 represent the variable surface distances that are changed during magnification change, and correspond to the distance between the first lens group G1 and the second lens group G2, the distance between the second lens group G2 and the third lens group G3, the distance between the third lens group G3 and the fourth lens group G4, and the distance between the fourth lens group G4 and the aperture stop St, respectively.

Table 2 shows values of specifications with respect to the d-line and the variable surface distances at the wide-angle end, at the middle focal length (the column of "Middle" in Table 2), and at the telephoto end, respectively. In Table 2, the symbol "f" means the focal length of the entire system, the symbol "Bf" means the back focus (equivalent air distance), the symbol "FNo." means the f-number, and the symbol "2ω" means the total angle of view (the unit of which is degrees).

In Table 1, the symbol "*" is added to the surface number of each aspheric surface, and the numerical value of each aspheric surface shown in the column of radius of curvature is the paraxial radius of curvature of the aspheric surface. Table 3 shows aspheric coefficients of each aspheric surface. In Table 3, the symbol "E-n" (where n is an integer) following the numerical value of each aspheric coefficient means "$\times 10^{-n}$". The aspheric coefficients are coefficients KA and Am (where m is a natural number and the values thereof vary among the examples) in the formula of aspheric surface shown below, where Σ means a sum with respect to the term "m":

$$Zd = C \cdot h^2 / \{1 + (1 - KA \cdot C^2 \cdot h^2)^{1/2}\} + \Sigma Am \cdot h^m,$$

where Zd is a depth of the aspheric surface (a length of a perpendicular line from a point at a height h on the aspheric surface to a plane tangent to the apex of the aspheric surface and perpendicular to the optical axis), h is the height (a distance from the optical axis to the lens surface), C is a paraxial radius of curvature, and KA and Am are aspheric coefficients (where m=3, 4, 5, . . . ).

TABLE 1

Example 1 - Basic Lens Data

| Si | Ri | Di | Ndj | vdj |
|---|---|---|---|---|
| 1 | 910.4733 | 1.3576 | 1.80400 | 46.58 |
| 2 | 62.9147 | 9.0602 | | |
| 3 | −73.4949 | 1.3649 | 1.77250 | 49.60 |
| 4 | 76.9703 | 5.3870 | 1.84661 | 23.78 |
| 5 | −929.7691 | 0.7172(inf) | | |
| *6 | 120.9103 | 7.6130 | 1.49700 | 81.54 |
| 7 | −77.2115 | 0.7130 | | |
| 8 | 134.4290 | 1.3649 | 1.80518 | 25.43 |
| 9 | 53.5105 | 8.5332 | 1.43875 | 94.93 |
| 10 | −383.5971 | 6.2635(inf) | | |
| 11 | 127.6922 | 5.5807 | 1.49700 | 81.54 |
| 12 | −223.3450 | 0.1163 | | |
| 13 | 92.2205 | 5.0298 | 1.49700 | 81.54 |
| 14 | 21200.6513 | 0.1160 | | |
| 15 | 65.5239 | 5.7555 | 1.49700 | 81.54 |
| 16 | 548.1694 | DD[16] | | |
| 17 | 101.4554 | 2.4602 | 1.49700 | 81.54 |
| 18 | −170.2207 | DD[18] | | |
| 19 | −92.5578 | 0.7560 | 1.83481 | 42.73 |
| *20 | 13.0068 | 4.9824 | | |
| 21 | −19.8566 | 0.6208 | 1.59282 | 68.63 |

TABLE 1-continued

Example 1 - Basic Lens Data

| Si | Ri | Di | Ndj | vdj |
|---|---|---|---|---|
| 22 | 42.3637 | 1.3193 | | |
| 23 | −645.9363 | 1.1939 | 1.73800 | 32.26 |
| 24 | −60.5381 | 0.1160 | | |
| 25 | 42.9907 | 2.1047 | 1.72916 | 54.68 |
| 26 | −97.8151 | 1.4517 | 1.73800 | 32.26 |
| 27 | −34.7104 | DD[27] | | |
| 28 | −21.6236 | 0.6248 | 1.49700 | 81.54 |
| 29 | 56.4131 | 1.3580 | 1.80518 | 25.43 |
| 30 | 493.3671 | DD[30] | | |
| 31(St) | ∞ | 0.7637 | | |
| 32 | 51.4001 | 2.8660 | 1.63476 | 57.24 |
| 33 | −65.0783 | 0.0772 | | |
| 34 | 49.8074 | 2.4336 | 1.64867 | 58.22 |
| 35 | −355.6688 | 2.5247 | | |
| 36 | 31.3636 | 3.5509 | 1.49700 | 81.54 |
| 37 | −38.3687 | 0.5426 | 2.00069 | 25.46 |
| 38 | 37.5557 | 0.0772 | | |
| 39 | 18.1193 | 3.6435 | 1.45000 | 87.43 |
| 40 | −280.2836 | 9.8400 | | |
| 41 | −156.1586 | 0.5427 | 1.91082 | 35.25 |
| 42 | 12.4271 | 2.4132 | 1.92286 | 18.90 |
| 43 | −93.0745 | 6.6369 | | |
| 44 | −16.3209 | 0.7757 | 1.92001 | 32.06 |
| 45 | 21.4995 | 0.6007 | | |
| 46 | 20.2583 | 2.7944 | 1.52442 | 63.45 |
| 47 | −25.7308 | 0.0772 | | |
| 48 | 29.5679 | 2.5181 | 1.49199 | 79.92 |
| 49 | −33.7432 | 1.4751 | | |
| 50 | 25.1793 | 3.8789 | 1.48999 | 60.69 |
| 51 | −16.9802 | 0.3169 | | |
| 52 | −15.1949 | 0.5039 | 1.80518 | 25.42 |
| 53 | −154.8332 | 10.0000 | | |
| 54 | ∞ | 1.0000 | 1.51633 | 64.14 |
| 55 | ∞ | 3.9824 | | |

TABLE 2

Example 1 - Specifications and Variable Surface Distances

| | Wide-Angle | Middle | Telephoto |
|---|---|---|---|
| Zoom Ratio | 1.0 | 3.5 | 9.6 |
| f | 10.00 | 35.30 | 96.00 |
| Bf | 14.64 | 14.64 | 14.64 |
| FNo. | 2.60 | 2.60 | 2.60 |
| 2ω[°] | 65.2 | 19.2 | 7.2 |
| DD[16] | 0.5410 | 23.4063 | 28.6436 |
| DD[18] | 0.7128 | 9.2865 | 14.6367 |
| DD[27] | 33.2914 | 2.8259 | 9.4912 |
| DD[30] | 19.6361 | 18.6626 | 1.4098 |

TABLE 3

Example 1 - Aspheric Coefficients

| Surface No. | 6 | 20 |
|---|---|---|
| KA | 1.0000000E+00 | 1.0000000E+00 |
| A4 | −7.7271400E−07 | −4.1534037E−05 |
| A6 | 3.3397897E−10 | −1.8536850E−07 |
| A8 | −8.9001231E−14 | 2.2799299E−10 |
| A10 | 3.3235877E−17 | −9.3000973E−12 |

Figure 9:
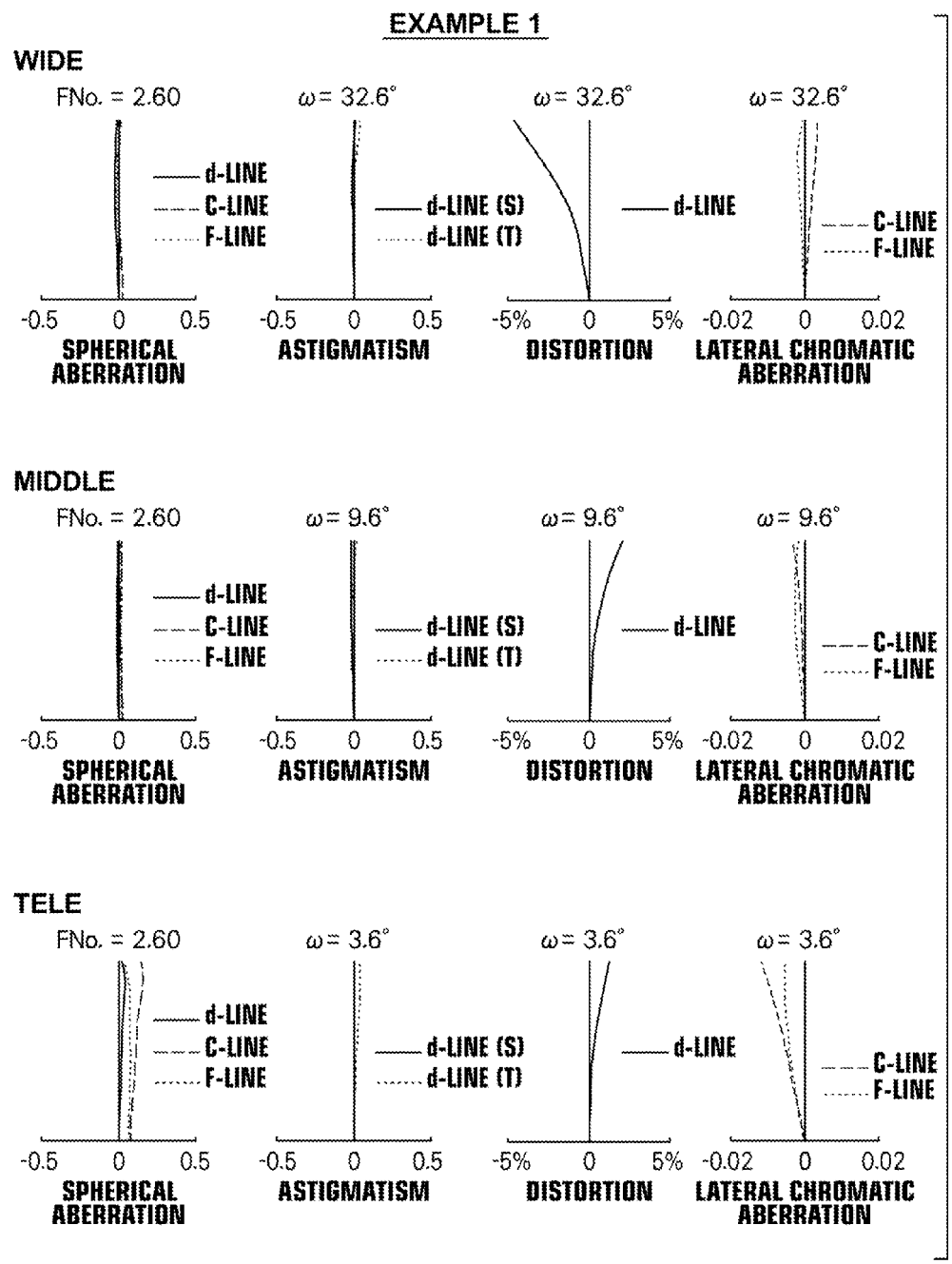
FIG. 9 shows aberration diagrams of the zoom lens of Example 1 of the invention, showing spherical aberration, astigmatism, distortion, and lateral chromatic aberration in this order from the left, where, the aberrations at the wide-angle end are shown at the top, the aberrations at the middle focal length are shown at the middle, and the aberrations at the telephoto end are shown at the bottom.

FIG. 9 shows aberrations of the zoom lens of Example 1, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 9 are those when the zoom lens is focused on an object at infinity, and the aberration diagrams in FIG. 9 show spherical aberration, astigmatism, distortion, and lateral chromatic aberration (chromatic aberration of magnification), in this order from the left, in each state.

In FIG. 9, each diagram of spherical aberration shows spherical aberrations with respect to the d-line (the wavelength of 587.6 nm), the C-line (the wavelength of 656.3 nm), and the F-line (the wavelength of 486.1 nm) in the solid line, the dashed line, and the dotted line, respectively. Each diagram of astigmatism shows astigmatisms with respect to the d-line in the sagittal direction and the tangential direction in the solid line and the dotted line, respectively. Each diagram of distortion shows distortions with respect to the d-line in the solid line. Each diagram of lateral chromatic aberration shows lateral chromatic aberrations with respect to the C-line and the F-line in the dashed line and the dotted line, respectively. The symbol "FNo." in each diagram of spherical aberration means f-number, and the symbol "ω" in the other aberration diagrams means a half value of the maximum total angle of view (i.e., half angle of view) when the zoom lens is focused on an object at infinity.

The symbols, the meanings, and the manners of description of the data explained above with respect to Example 1 also apply to the other examples described below, unless otherwise noted, and the same explanations are not repeated below.

Example 2

Figure 5:
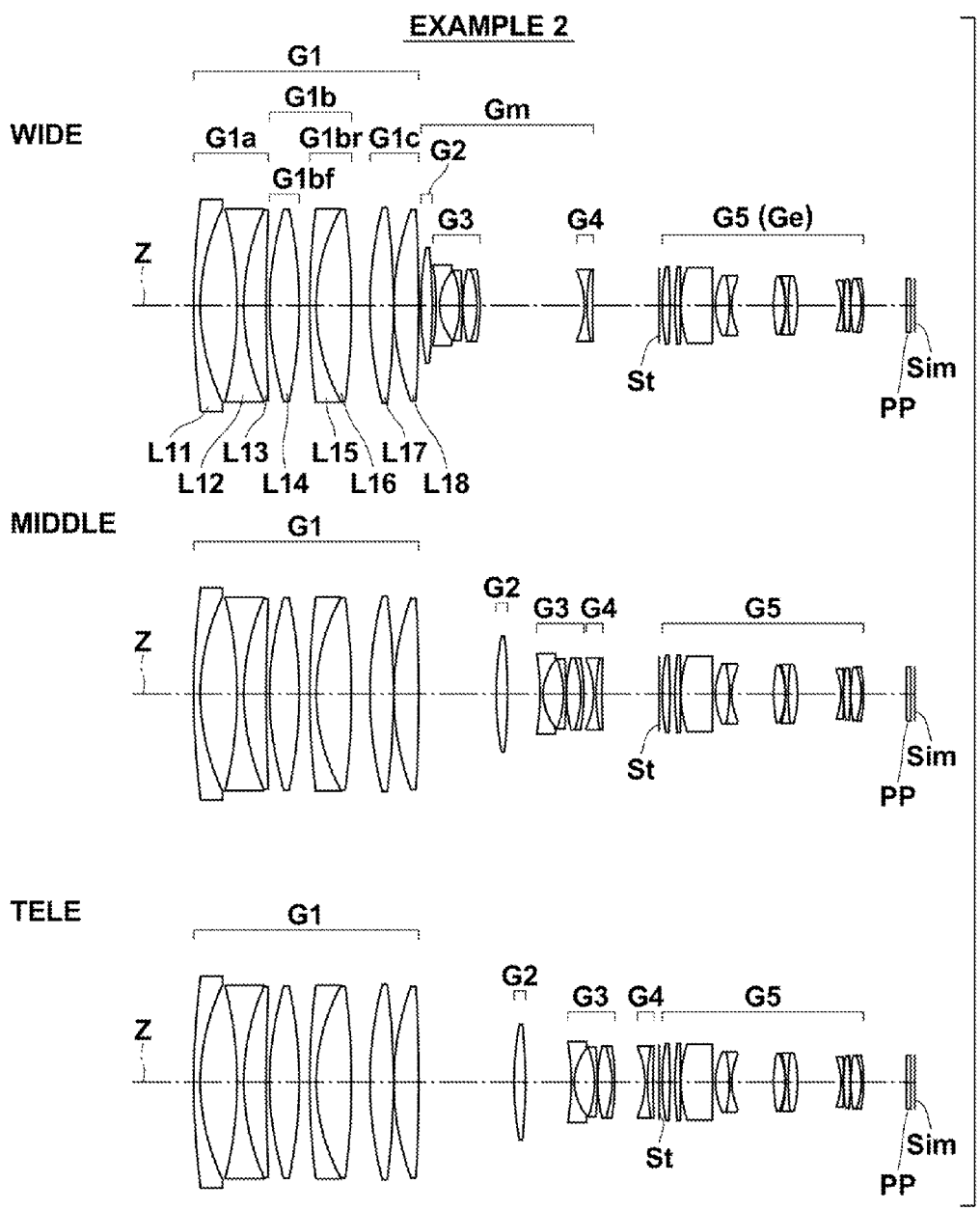
FIG. 5 is a sectional view illustrating the lens configuration of a zoom lens of Example 2 of the invention, where the state at the wide-angle end is shown at the top, the state at the middle focal length is shown at the middle, and the state at the telephoto end is shown at the bottom.

FIG. 5 is a sectional view illustrating the lens configuration of a zoom lens of Example 2 when the zoom lens is focused on an object at infinity. The schematic configuration of the zoom lens of Example 2 is almost similar to that of Example 1, except that, in the zoom lens of Example 2, the first lens-group middle group G1b consists of two lens groups, i.e., a first lens-group middle-group front part G1bf and a first lens-group middle-group rear part G1br, where the first lens-group middle-group front part G1bf and the first lens-group middle-group rear part G1br are moved along the optical axis direction to change an air space therebetween during focusing. The first lens-group front group G1a consists of lenses L11 to L13 in this order from the object side, the first lens-group middle-group front part G1bf consists of a lens L14, the first lens-group middle-group rear part G1br consists of lenses L15 to L16 in this order from the object side, and the first lens-group rear group G1c consists of lenses L17 to L18 in this order from the object side. The lens L14 is the only aspheric lens included in the first lens-group middle group G1b, where the object-side surface of the lens L14 is an aspheric surface, and the image-side surface of the lens L14 is a spherical surface.

Tables 4, 5, and 6 show basic lens data, specifications and variable surface distances, and aspheric coefficients of the zoom lens of Example 2.

TABLE 4

Example 2 - Basic Lens Data

| Si | Ri | Di | Ndj | vdj |
|---|---|---|---|---|
| 1 | 182.0921 | 1.5509 | 1.80400 | 46.58 |
| 2 | 50.4243 | 8.6052 | | |
| 3 | −86.5130 | 1.5582 | 1.77250 | 49.60 |
| 4 | 53.4000 | 5.2407 | 1.84661 | 23.78 |
| 5 | 465.1676 | 0.7332(inf) | | |
| *6 | 64.1959 | 6.9877 | 1.49700 | 81.54 |
| 7 | −102.1682 | 2.4336(inf) | | |
| 8 | 169.0477 | 1.5510 | 1.80518 | 25.43 |
| 9 | 44.7788 | 8.2530 | 1.43875 | 94.93 |
| 10 | −164.5358 | 4.3557(inf) | | |
| 11 | 89.8596 | 5.4329 | 1.59282 | 68.63 |
| 12 | −176.6030 | 0.1160 | | |
| 13 | 61.2353 | 5.7744 | 1.59282 | 68.63 |
| 14 | −413.0078 | DD[14] | | |
| 15 | 71.3313 | 2.6456 | 1.49700 | 81.54 |
| 16 | −128.7966 | DD[16] | | |
| 17 | −56.3916 | 0.7556 | 1.83481 | 42.73 |
| *18 | 10.8954 | 4.7375 | | |
| 19 | −21.3948 | 0.6200 | 1.49700 | 81.54 |
| 20 | −108.9337 | 0.1159 | | |
| 21 | 33.1005 | 3.3067 | 1.73800 | 32.26 |
| 22 | −24.5198 | 0.6975 | 1.74320 | 49.34 |
| 23 | −46.4871 | DD[23] | | |
| 24 | −18.4086 | 0.6245 | 1.49700 | 81.54 |
| 25 | 41.9882 | 1.2853 | 1.80518 | 25.43 |
| 26 | 168.1652 | DD[26] | | |
| 27(St) | ∞ | 0.7634 | | |
| 28 | 48.2035 | 1.8377 | 1.74320 | 49.34 |
| 29 | −119.5672 | 1.1633 | | |
| 30 | 75.0805 | 1.2400 | 1.74320 | 49.34 |
| 31 | −3009.0040 | 0.0778 | | |
| 32 | 25.1933 | 7.4581 | 1.58913 | 61.14 |
| 33 | −348.2512 | 0.6621 | | |
| 34 | 15.2170 | 3.2645 | 1.49700 | 81.54 |
| 35 | −32.1011 | 0.5815 | 2.00069 | 25.46 |
| 36 | 14.6817 | 9.7742 | | |
| 37 | 31.8662 | 2.7329 | 1.49700 | 81.54 |
| 38 | −16.9694 | 0.1104 | | |
| 39 | −22.0756 | 0.5424 | 1.91082 | 35.25 |
| 40 | 41.9577 | 2.2357 | 1.92286 | 18.90 |
| 41 | −24.8104 | 10.1541 | | |
| 42 | −14.1424 | 0.5428 | 1.84661 | 23.78 |
| 43 | −384.3566 | 0.0772 | | |
| 44 | 40.0185 | 1.5703 | 1.48749 | 70.23 |
| 45 | −51.4119 | 0.0772 | | |
| 46 | 33.3304 | 2.4625 | 1.43875 | 94.93 |
| 47 | −17.3834 | 0.5427 | 1.80518 | 25.42 |
| 48 | −31.8885 | 10.0000 | | |
| 49 | ∞ | 1.0000 | 1.51633 | 64.14 |
| 50 | ∞ | 0.9798 | | |

TABLE 5

Example 2 - Specifications and Variable Surface Distances

| | Wide-Angle | Middle | Telephoto |
|---|---|---|---|
| Zoom Ratio | 1.0 | 3.5 | 8.0 |
| f | 10.00 | 35.30 | 80.00 |
| Bf | 11.64 | 11.64 | 11.64 |
| FNo. | 2.65 | 2.65 | 2.65 |
| 2ω[°] | 65.2 | 19.2 | 8.6 |
| DD[14] | 0.5390 | 18.1583 | 22.3598 |
| DD[16] | 0.9504 | 7.6189 | 10.6945 |
| DD[23] | 24.4241 | 2.3113 | 7.0531 |
| DD[26] | 15.5742 | 13.3992 | 1.3803 |

TABLE 6

Example 2 - Aspheric Coefficients

| Surface No. | 6 | 18 |
|---|---|---|
| KA | 1.0000000E+00 | 1.0000000E+00 |
| A4 | −2.6429725E−06 | −6.8406069E−05 |
| A6 | 9.8702394E−10 | −5.7284103E−07 |
| A8 | −2.5538962E−13 | 1.6970587E−09 |
| A10 | 3.6036834E−17 | −5.9410304E−11 |

Figure 10:
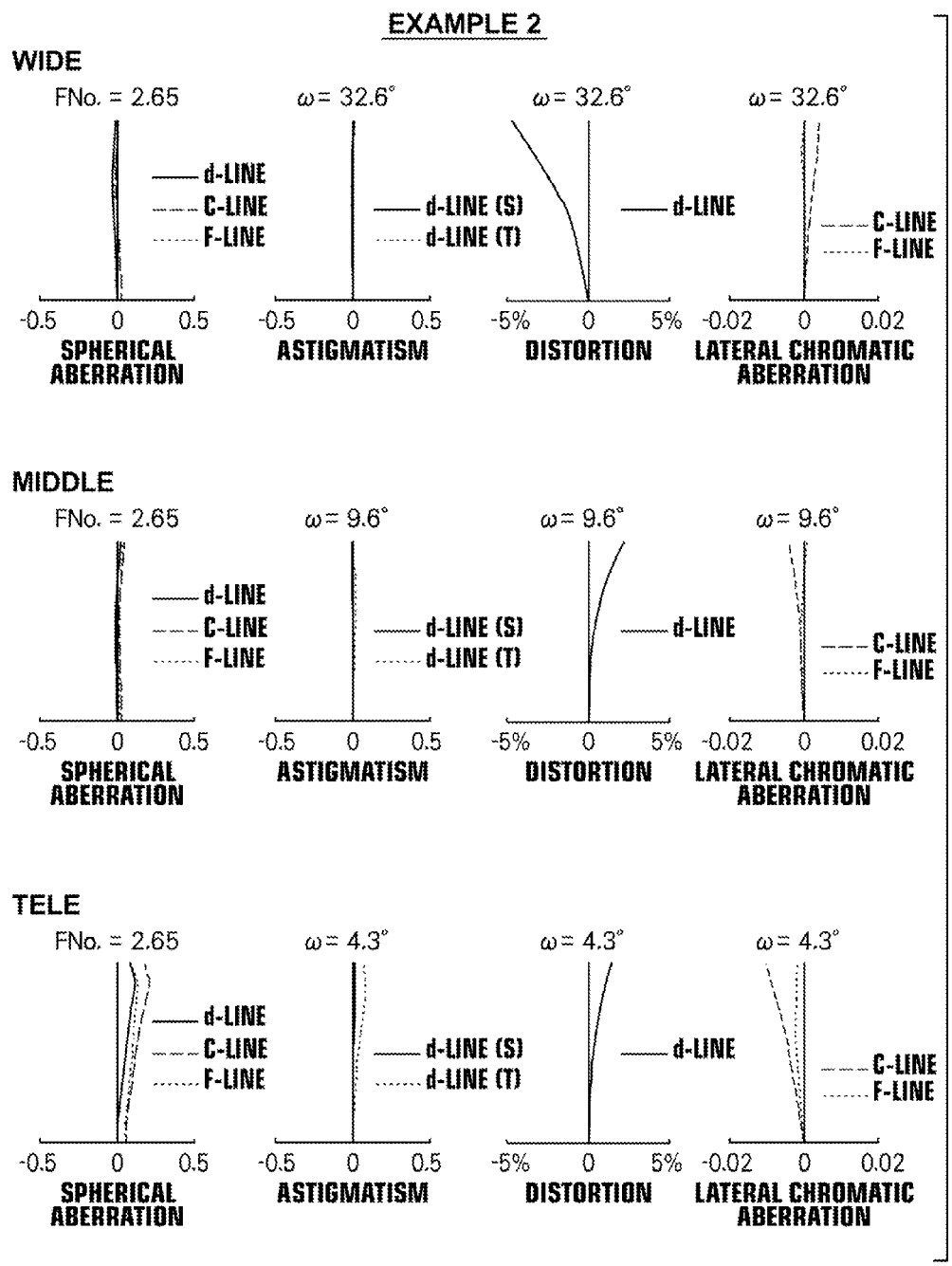
FIG. 10 shows aberration diagrams of the zoom lens of Example 2 of the invention, showing spherical aberration, astigmatism, distortion, and lateral chromatic aberration in this order from the left, where the aberrations at the wide-angle end are shown at the top, the aberrations at the middle focal length are shown at the middle, and the aberrations at the telephoto end are shown at the bottom.

FIG. 10 shows aberrations of the zoom lens of Example 2, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 10 are those when the zoom lens is focused on an object at infinity, and the aberration diagrams in FIG. 10 show spherical aberration, astigmatism, distortion, and lateral chromatic aberration (chromatic aberration of magnification), in this order from the left, in each state.

Example 3

Figure 6:
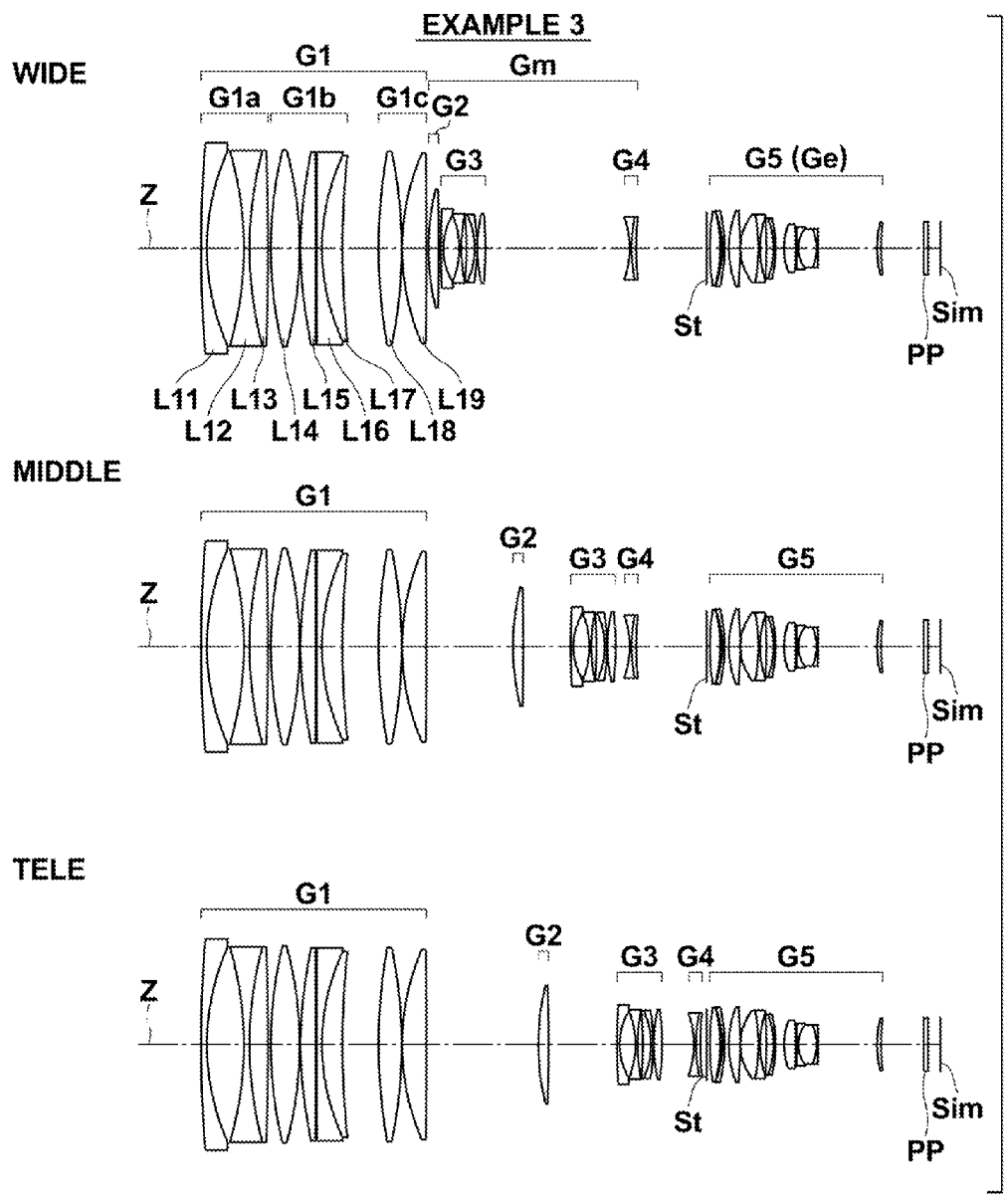
FIG. 6 is a sectional view illustrating the lens configuration of a zoom lens of Example 3 of the invention, where the state at the wide-angle end is shown at the top, the state at the middle focal length is shown at the middle, and the state at the telephoto end is shown at the bottom.

FIG. 6 is a sectional view illustrating the lens configuration of a zoom lens of Example 3 when the zoom lens is focused on an object at infinity. The schematic configuration of the zoom lens of Example 3 is almost similar to that of Example 1, except that, in the zoom lens of Example 3, the first lens-group middle group G1b consists of lenses L14 to L17 in this order from the object side, the first lens-group rear group G1c consists of lenses L18 to L19 in this order from the object side, and the lens L15 is the only aspheric lens included in the first lens-group middle group G1b. The object-side surface of the lens L15 is an aspheric surface, and the image-side surface of the lens L15 is a spherical surface.

Tables 7, 8, and 9 show basic lens data, specifications and variable surface distances, and aspheric coefficients of the zoom lens of Example 3. In Table 9, "-" is shown, in place of a numerical value, where no aspheric coefficient is present.

TABLE 7

Example 3 - Basic Lens Data

| Si | Ri | Di | Ndj | vdj |
|---|---|---|---|---|
| 1 | 295.5111 | 1.3646 | 1.83481 | 42.73 |
| 2 | 54.1297 | 8.7236 | | |
| 3 | −77.9219 | 1.3256 | 1.77250 | 49.60 |
| 4 | 85.0752 | 4.3304 | 1.84666 | 23.83 |
| 5 | −694.2948 | 0.7006(inf) | | |
| 6 | 95.3744 | 6.7952 | 1.49700 | 81.61 |
| 7 | −84.5676 | 0.1946 | | |
| *8 | 88.7345 | 3.6163 | 1.48749 | 70.23 |
| 9 | −1941.5308 | 0.1946 | | |
| 10 | 4112.0950 | 1.2866 | 1.73800 | 32.26 |
| 11 | 49.6098 | 4.8064 | 1.49700 | 81.61 |
| 12 | 195.7899 | 8.5494(inf) | | |
| 13 | 124.6742 | 5.4165 | 1.59282 | 68.63 |
| 14 | −107.5161 | 0.1166 | | |
| 15 | 54.0895 | 5.7036 | 1.49700 | 81.61 |
| 16 | −1742.3686 | DD[16] | | |
| 17 | 55.4299 | 2.4178 | 1.43700 | 95.10 |
| 18 | −468.7459 | DD[18] | | |
| *19 | 215.9389 | 0.5848 | 2.00069 | 25.46 |
| 20 | 14.7645 | 3.7784 | | |
| 21 | −19.4500 | 0.4679 | 1.59282 | 68.63 |
| 22 | 36.9438 | 1.1960 | | |
| 23 | −91.7134 | 1.9510 | 1.84666 | 23.83 |
| 24 | −18.3549 | 0.5263 | 1.83481 | 42.73 |
| 25 | −48.2088 | 0.1166 | | |
| 26 | 34.6993 | 1.9176 | 1.73800 | 32.26 |
| 27 | −76.3073 | DD[27] | | |
| 28 | −20.7939 | 0.4679 | 1.49700 | 81.61 |
| 29 | 36.1327 | 1.0952 | 1.80809 | 22.76 |
| 30 | 89.3082 | DD[30] | | |
| 31(St) | ∞ | 0.7681 | | |
| 32 | 56.5205 | 2.4420 | 1.71430 | 38.90 |
| 33 | −31.8960 | 0.5071 | | |

TABLE 7-continued

Example 3 - Basic Lens Data

| Si | Ri | Di | Ndj | vdj |
|---|---|---|---|---|
| 34 | −23.2250 | 0.5068 | 1.80518 | 25.42 |
| 35 | −37.1957 | 1.0527 | | |
| 36 | 23.8666 | 2.6320 | 1.48749 | 70.23 |
| 37 | −101.6084 | 0.0780 | | |
| 38 | 12.5622 | 4.1912 | 1.43875 | 94.93 |
| 39 | −45.1260 | 0.4484 | 1.90366 | 31.32 |
| 40 | 22.4231 | 1.4469 | | |
| 41 | −195.1277 | 1.7562 | 1.84666 | 23.83 |
| 42 | −17.9820 | 0.4289 | 1.83481 | 42.73 |
| 43 | −30.4402 | 2.0335 | | |
| 44 | 16.0466 | 2.6869 | 1.49700 | 81.61 |
| 45 | −94.9212 | 0.2726 | | |
| 46 | −580.7749 | 0.3509 | 1.88300 | 40.80 |
| 47 | 7.1507 | 4.3558 | 1.43875 | 94.93 |
| 48 | −10.6523 | 0.3116 | 1.77250 | 49.60 |
| 49 | −191.6367 | 13.9243 | | |
| 50 | 23.9771 | 0.9904 | 1.62004 | 36.26 |
| 51 | 61.9044 | 10.0000 | | |
| 52 | ∞ | 1.0000 | 1.51633 | 64.14 |
| 53 | ∞ | 2.9273 | | |

TABLE 8

Example 3 - Specifications and Variable Surface Distances

| | Wide-Angle | Middle | Telephoto |
|---|---|---|---|
| Zoom Ratio | 1.0 | 3.9 | 11.6 |
| f | 10.00 | 39.02 | 116.00 |
| Bf | 13.59 | 13.59 | 13.59 |
| FNo. | 3.31 | 3.31 | 3.65 |
| 2ω[°] | 65.8 | 17.4 | 6.0 |
| DD[16] | 0.4936 | 20.4543 | 26.4231 |
| DD[18] | 0.5033 | 11.2245 | 16.1690 |
| DD[27] | 33.9988 | 3.3267 | 7.5887 |
| DD[30] | 16.6039 | 16.5941 | 1.4189 |

TABLE 9

Example 3 - Aspheric Coefficients

| Surface No. | 8 | 19 |
|---|---|---|
| KA | 1.0000000E+00 | 1.0000000E+00 |
| A3 | 0.0000000E+00 | — |
| A4 | −1.4156714E−06 | 1.1380915E−05 |
| A5 | −1.9247466E−09 | — |
| A6 | 1.8575993E−10 | −5.1401174E−08 |
| A7 | −2.3682617E−12 | — |
| A8 | −9.9008006E−14 | 1.5082225E−11 |
| A9 | 2.3167775E−15 | — |
| A10 | 2.2428271E−17 | −2.0205926E−13 |

FIG. 11 shows aberrations of the zoom lens of Example 3, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 11 are those when the zoom lens is focused on an object at infinity, and the aberration diagrams in FIG. 11 show spherical aberration, astigmatism, distortion, and lateral chromatic aberration (chromatic aberration of magnification), in this order from the left, in each state.

Example 4

Figure 7:
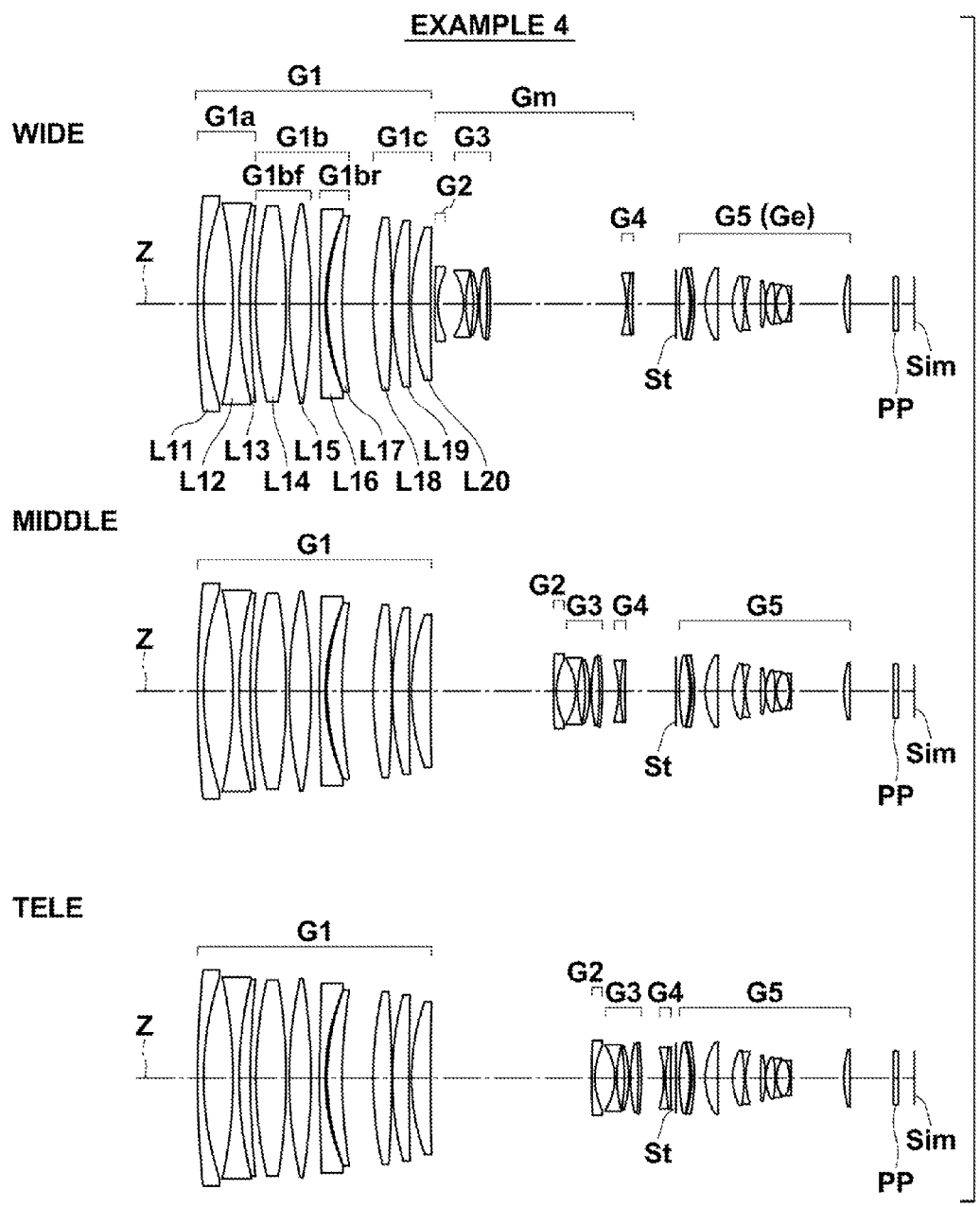
FIG. 7 is a sectional view illustrating the lens configuration of a zoom lens of Example 4 of the invention, where the state at the wide-angle end is shown at the top, the state at the middle focal length is shown at the middle, and the state at the telephoto end is shown at the bottom.

FIG. 7 is a sectional view illustrating the lens configuration of a zoom lens of Example 4 when the zoom lens is focused on an object at infinity. The schematic configuration of the zoom lens of Example 4 is almost similar to that of Example 2, except that, in the zoom lens of Example 4, the second lens group G2 has a negative refractive power, the first lens-group middle-group front part G1bf consists of lenses L14 to L15, the first lens-group middle-group rear part G1br consists of lenses L16 to L17 in this order from the object side, the first lens-group rear group G1c consists of lenses L18 to L20 in this order from the object side, and the lens L16 is the only aspheric lens included in the first lens-group middle group G1b. The object-side surface of the lens L16 is an aspheric surface, and the image-side surface of the lens L16 is a spherical surface.

Tables 10, 11, and 12 show basic lens data, specifications and variable surface distances, and aspheric coefficients of the zoom lens of Example 4.

TABLE 10

Example 4 - Basic Lens Data

| Si | Ri | Di | Ndj | vdj |
|---|---|---|---|---|
| 1 | 230.7967 | 1.3934 | 1.81600 | 46.62 |
| 2 | 69.8275 | 6.7728 | | |
| 3 | −100.2389 | 1.3646 | 1.77250 | 49.60 |
| 4 | 86.2376 | 2.5908 | 1.92286 | 18.90 |
| 5 | 200.2577 | 1.2798(inf) | | |
| 6 | 96.5019 | 6.9057 | 1.49700 | 81.61 |
| 7 | −133.2598 | 0.7435 | | |
| 8 | 99.0098 | 4.9641 | 1.43875 | 94.94 |
| 9 | −134.2035 | 1.9797(inf) | | |
| *10 | 395.3154 | 1.3200 | 1.73800 | 32.26 |
| 11 | 48.0407 | 0.4561 | | |
| 12 | 52.8083 | 3.4507 | 1.49700 | 81.61 |
| 13 | 120.2771 | 7.0955(inf) | | |
| 14 | 88.7525 | 4.2321 | 1.49700 | 81.61 |
| 15 | −262.4261 | 0.1100 | | |
| 16 | 67.5380 | 3.9077 | 1.59282 | 68.62 |
| 17 | 1016.5572 | 0.5372 | | |
| 18 | 48.6726 | 4.3573 | 1.49700 | 81.54 |
| 19 | 557.2137 | DD[19] | | |
| *20 | −1783.6063 | 0.6598 | 1.90366 | 31.31 |
| 21 | 15.4720 | DD[21] | | |
| 22 | −12.6353 | 0.5135 | 1.59282 | 68.62 |
| 23 | 25.6809 | 1.6892 | | |
| 24 | −39.6171 | 1.0713 | 1.80518 | 25.42 |
| 25 | −21.9293 | 0.3649 | | |
| 26 | 33.2142 | 1.7711 | 1.73800 | 32.26 |
| 27 | −83.4616 | 0.7333 | 1.74320 | 49.34 |
| 28 | −62.7025 | DD[28] | | |
| 29 | −22.1974 | 0.4804 | 1.49700 | 81.54 |
| 30 | 38.3943 | 1.0267 | 1.71736 | 29.52 |
| 31 | 149.9100 | DD[31] | | |
| 32(St) | ∞ | 0.7375 | | |
| 33 | 39.0189 | 2.3998 | 1.61293 | 37.00 |
| 34 | −28.9012 | 0.4232 | | |
| 35 | −24.1392 | 0.5786 | 1.80518 | 25.42 |
| 36 | −39.7721 | 2.5156 | | |
| 37 | 15.0851 | 2.8835 | 1.58913 | 61.13 |
| 38 | 372.5314 | 3.4150 | | |
| 39 | 12.9888 | 2.6516 | 1.43875 | 94.94 |
| 40 | −32.2503 | 0.3665 | 1.90366 | 31.31 |
| 41 | 17.8142 | 3.4378 | | |
| 42 | 841.9142 | 1.0589 | 1.84139 | 24.56 |
| 43 | −23.7456 | 0.0730 | | |
| 44 | 9.2743 | 2.1558 | 1.43875 | 94.94 |
| 45 | −27.3439 | 0.2931 | 1.88300 | 40.80 |
| 46 | 7.0063 | 0.0363 | | |
| 47 | 7.0004 | 2.9872 | 1.43875 | 94.94 |
| 48 | −9.4768 | 0.2930 | 1.81600 | 46.62 |
| 49 | 80.6343 | 12.1765 | | |
| 50 | 22.2407 | 1.4071 | 1.74077 | 27.79 |
| 51 | 964.9198 | 10.0000 | | |
| 52 | ∞ | 1.0000 | 1.51633 | 64.14 |
| 53 | ∞ | 3.7567 | | |

TABLE 11

Example 4 - Specifications and Variable Surface Distances

| | Wide-Angle | Middle | Telephoto |
|---|---|---|---|
| Zoom Ratio | 1.0 | 3.9 | 10.0 |
| f | 10.00 | 39.02 | 100.00 |
| Bf | 14.42 | 14.42 | 14.42 |
| FNo. | 3.33 | 3.33 | 3.70 |
| 2ω[°] | 62.2 | 16.6 | 6.6 |
| DD[19] | 1.0354 | 28.2904 | 37.0403 |
| DD[21] | 5.9046 | 4.3393 | 4.5756 |
| DD[28] | 31.1370 | 3.6986 | 5.1301 |
| DD[31] | 10.0070 | 11.7557 | 1.3380 |

TABLE 12

Example 4 - Aspheric Coefficients

| Surface No. | 10 | 20 |
|---|---|---|
| KA | 1.0000000E+00 | 1.0000000E+00 |
| A4 | −5.0194998E−07 | 5.2523368E−05 |
| A6 | 6.8139362E−11 | −6.5365501E−08 |
| A8 | −4.2966748E−14 | 1.4940574E−10 |
| A10 | 1.4574599E−16 | 5.7157814E−12 |

FIG. 12 shows aberrations of the zoom lens of Example 4, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 12 are those when the zoom lens is focused on an object at infinity, and the aberration diagrams in FIG. 12 show spherical aberration, astigmatism, distortion, and lateral chromatic aberration (chromatic aberration of magnification), in this order from the left, in each state.

Example 5

Figure 8:
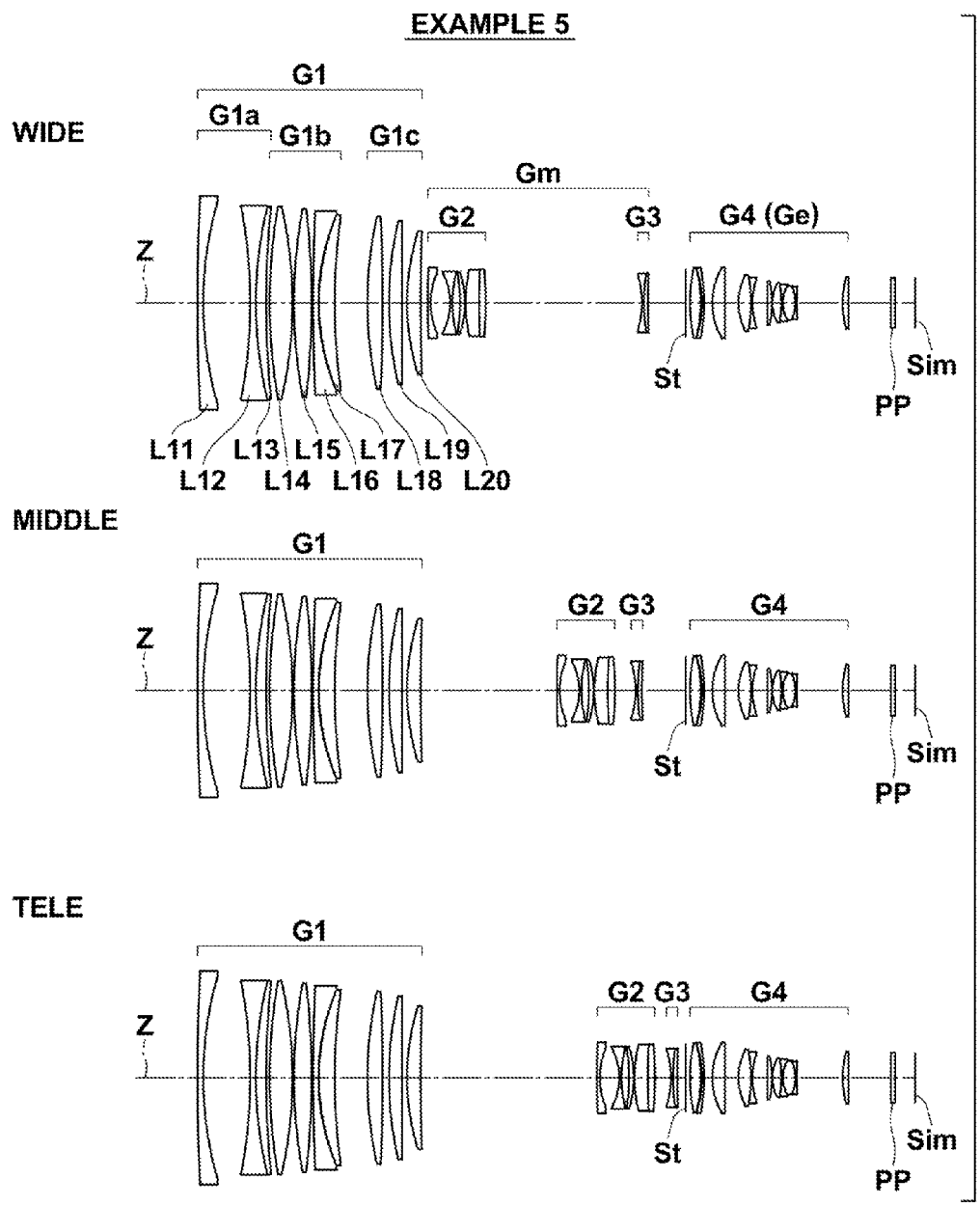
FIG. 8 is a sectional view illustrating the lens configuration of a zoom lens of Example 5 of the invention, where the state at the wide-angle end is shown at the top, the state at the middle focal length is shown at the middle, and the state at the telephoto end is shown at the bottom.

FIG. 8 is a sectional view illustrating the lens configuration of a zoom lens of Example 5 when the zoom lens is focused on an object at infinity. The schematic configuration of the zoom lens of Example 5 is as follows. The zoom lens of Example 5 consists essentially of four lens groups consisting of, in order from the object side, a first lens group G1 having a positive refractive power, a second lens group G2 having a negative refractive power, a third lens group G3 having a negative refractive power, an aperture stop St, and a fourth lens group G4 having a positive refractive power. During magnification change from the wide-angle end to the telephoto end, the first lens group G1 and the fourth lens group G4 are fixed relative to the image plane Sim, and the second lens group G2 and the third lens group G3 are moved along the optical axis direction to change an air space therebetween. That is, the lens group formed by the second lens group G2 and the third lens group G3 corresponds to the moving lens group Gm, and the fourth lens group G4 corresponds to the end lens group Ge. The first lens group G1 consists essentially of three lens groups consisting of, in order from the object side, a first lens-group front group G1a having a negative refractive power, a first lens-group middle group G1b having a positive refractive power, and a first lens-group rear group G1c having a positive refractive power. During focusing from an object at infinity to a close object, the first lens-group front group G1a and the first lens-group rear group G1c are fixed relative to the image plane Sim, and only the first lens-group middle group Gib is moved along the optical axis direction. The first lens-group front group G1a consists of lenses L11 to L13 in this order from the object side, the first lens-group middle group Gib consists of lenses L14 to L17 in this order from the object side, and the first lens-group rear group G1c consists of lenses L18 to L20 in this order from the object side. The lens L16 is the only aspheric lens included in the first lens-group middle group G1b, where the object-side surface of the lens L16 is an aspheric surface, and the image-side surface of the lens L16 is a spherical surface.

Tables 13, 14, and 15 show basic lens data, specifications and variable surface distances, and aspheric coefficients of the zoom lens of Example 5.

TABLE 13

Example 5 - Basic Lens Data

| Si | Ri | Di | Ndj | vdj |
|---|---|---|---|---|
| 1 | 509.8448 | 1.3449 | 1.81600 | 46.62 |
| 2 | 80.0326 | 10.9739 | | |
| 3 | −111.1128 | 1.3166 | 1.77250 | 49.60 |
| 4 | 87.8093 | 2.4341 | 1.92286 | 18.90 |
| 5 | 206.8114 | 0.8071(inf) | | |
| 6 | 123.3912 | 5.3531 | 1.49700 | 81.61 |
| 7 | −92.3698 | 0.3537 | | |
| 8 | 113.9942 | 4.0977 | 1.43875 | 94.94 |
| 9 | −179.5794 | 0.3537 | | |
| *10 | 386.0025 | 1.2741 | 1.73800 | 32.26 |
| 11 | 49.0327 | 0.1383 | | |
| 12 | 50.5050 | 3.6608 | 1.49700 | 81.61 |
| 13 | 137.1612 | 7.6393(inf) | | |
| 14 | 85.4173 | 3.5245 | 1.49700 | 81.61 |
| 15 | −479.8887 | 1.5073 | | |
| 16 | 77.2730 | 3.1167 | 1.59282 | 68.62 |
| 17 | 20919.6620 | 1.1359 | | |
| 18 | 52.4621 | 3.2188 | 1.49700 | 81.61 |
| 19 | 502.7037 | DD[19] | | |
| *20 | −784.4774 | 0.6375 | 1.90366 | 31.31 |
| 21 | 16.1615 | 4.5827 | | |
| 22 | −13.3365 | 0.4955 | 1.59282 | 68.62 |
| 23 | 25.3344 | 1.7611 | | |
| 24 | −42.4734 | 1.1813 | 1.80518 | 25.42 |
| 25 | −21.3729 | 0.1062 | | |
| 26 | 30.1827 | 3.1745 | 1.73800 | 32.26 |
| 27 | 160.5156 | 1.5548 | 1.74320 | 49.34 |
| 28 | −91.0727 | DD[28] | | |
| 29 | −20.0051 | 0.4635 | 1.49700 | 81.61 |
| 30 | 37.5910 | 0.9912 | 1.71736 | 29.52 |
| 31 | 170.9458 | DD[31] | | |
| 32(St) | ∞ | 1.0359 | | |
| 33 | 36.2925 | 2.5303 | 1.61293 | 37.00 |
| 34 | −28.0175 | 0.3024 | | |
| 35 | −22.9494 | 0.4953 | 1.80518 | 25.42 |
| 36 | −38.7142 | 1.8884 | | |
| 37 | 15.1707 | 2.9556 | 1.58913 | 61.13 |
| 38 | 1509.2615 | 3.1627 | | |
| 39 | 13.3204 | 2.9580 | 1.43875 | 94.94 |
| 40 | −29.9539 | 0.3539 | 1.90366 | 31.31 |
| 41 | 16.8918 | 3.4385 | | |
| 42 | 469.8371 | 1.0989 | 1.84139 | 24.56 |
| 43 | −22.4505 | 0.0711 | | |
| 44 | 8.7102 | 2.1214 | 1.43875 | 94.94 |
| 45 | −26.6127 | 0.2830 | 1.88300 | 40.80 |

TABLE 13-continued

Example 5 - Basic Lens Data

| Si | Ri | Di | Ndj | vdj |
|---|---|---|---|---|
| 46 | 6.9112 | 0.0351 | | |
| 47 | 6.8326 | 2.9431 | 1.43875 | 94.94 |
| 48 | −9.2701 | 0.2829 | 1.81600 | 46.62 |
| 49 | 54.4341 | 10.8397 | | |
| 50 | 22.1103 | 1.2534 | 1.75520 | 27.51 |
| 51 | 451.0383 | 10.0000 | | |
| 52 | ∞ | 1.0000 | 1.51633 | 64.14 |
| 53 | ∞ | 4.6688 | | |

TABLE 14

Example 5 - Specifications and Variable Surface Distances

| | Wide-Angle | Middle | Telephoto |
|---|---|---|---|
| Zoom Ratio | 1.0 | 3.9 | 9.5 |
| f | 10.00 | 39.02 | 95.00 |
| Bf | 15.33 | 15.33 | 15.33 |
| FNo. | 3.35 | 3.35 | 3.71 |
| 2ω[°] | 60.8 | 16.0 | 6.6 |
| DD[19] | 1.6657 | 31.8601 | 41.2302 |
| DD[28] | 36.5909 | 4.9230 | 3.8214 |
| DD[31] | 8.7520 | 10.2255 | 1.9570 |

TABLE 15

Example 5 - Aspheric Coefficients

| Surface No. | 10 | 20 |
|---|---|---|
| KA | 1.0000000E+00 | 1.0000000E+00 |
| A4 | −3.2518722E−07 | 5.3017386E−05 |
| A6 | −8.5780266E−11 | −1.0025648E−07 |
| A8 | 3.2330052E−13 | 8.4724007E−10 |
| A10 | −3.0620932E−16 | 4.4200964E−12 |

FIG. 13 shows aberrations of the zoom lens of Example 5, where the aberrations at the wide-angle end are shown at the top denoted by the text "WIDE", the aberrations at the middle focal length are shown at the middle denoted by the text "MIDDLE", and the aberrations at the telephoto end are shown at the bottom denoted by the text "TELE". The aberrations shown in FIG. 13 are those when the zoom lens is focused on an object at infinity, and the aberration diagrams in FIG. 13 show spherical aberration, astigmatism, distortion, and lateral chromatic aberration (chromatic aberration of magnification), in this order from the left, in each state.

Table 16 shows values corresponding to and relating to the condition expressions (1) to (8) of the zoom lenses of Examples 1 to 5.

TABLE 16

|  |  | Example 1 | Example 2 | Example 3 | Example 4 | Example 5 |
|---|---|---|---|---|---|---|
|  | Xf(yf) | −0.1559 | −0.4148 | −0.2022 | −0.0342 | −0.0256 |
|  | Xr(yr) | 0.0000 | 0.0000 | 0.0000 | 0.0000 | 0.0000 |
|  | fw | 10.000 | 10.000 | 10.000 | 10.000 | 10.000 |
|  | Das | 112.5 | 89.5 | 95.8 | 80.8 | 87.2 |
|  | y | 22.358 | 20.688 | 19.471 | 16.299 | 16.673 |
|  | IH | 6.109 | 6.106 | 6.141 | 5.776 | 5.576 |
|  | Zr | 9.6 | 8.0 | 11.6 | 10.0 | 9.5 |
|  | f1 | 56.465 | 47.616 | 56.726 | 44.997 | 49.181 |
|  | f1a | −46.826 | −45.812 | −47.332 | −51.633 | −51.809 |
|  | f1b | 93.507 | 85.734 | 99.946 | 110.839 | 109.465 |
|  | Nd(1a−) | 1.78825 | 1.78825 | 1.80366 | 1.79425 | 1.79425 |
|  | vd(1a+) | 23.78 | 23.78 | 23.83 | 18.90 | 18.90 |
| (1) | [Xr(yr) − Xf(yf)]/fw | 0.0156 | 0.0415 | 0.0202 | 0.0034 | 0.0026 |
| (2) | $Das \cdot y/IH^2$ | 67.38 | 49.69 | 49.46 | 39.46 | 46.79 |
| (3) | $Das/(IH \cdot Zr)$ | 1.92 | 1.83 | 1.34 | 1.40 | 1.65 |
| (4) | f1b/fw | 9.35 | 8.57 | 9.99 | 11.08 | 10.95 |
| (5) | f1/fw | 5.65 | 4.76 | 5.67 | 4.50 | 4.92 |
| (6) | Nd(1a−) | 1.78825 | 1.78825 | 1.80366 | 1.79425 | 1.79425 |
| (7) | vd(1a+) | 23.78 | 23.78 | 23.83 | 18.90 | 18.90 |
| (8) | f1a/fw | −4.68 | −4.58 | −4.73 | −5.16 | −5.18 |

As can be seen from the above-described data, each of the zoom lenses of Examples 1 to 5 has a high magnification with a zoom ratio in the range from 8× to 12×, is compact and light weight relative to a large image size, and has good performance across the entire zoom range with successfully corrected aberrations and preferably suppressed change of aberrations during magnification change to achieve high optical performance.

Figure 14:
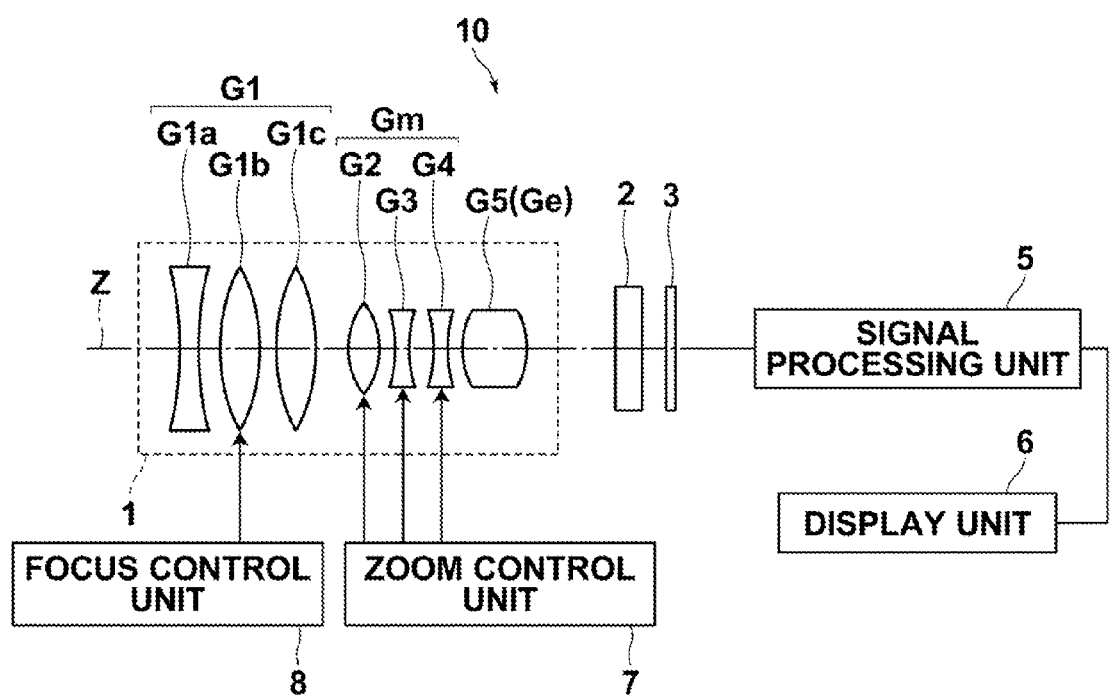
FIG. 14 is a diagram illustrating the schematic configuration of an imaging apparatus according to an embodiment of the invention.

Next, an imaging apparatus according to an embodiment of the invention is described with reference to FIG. 14. FIG. 14 illustrates the schematic configuration of an imaging apparatus 10 according to one embodiment of the invention employing a zoom lens 1 according to the embodiment of the invention. Examples of the imaging apparatus 10 include a digital camera, a video camera, a motion-picture camera, a broadcasting camera, a monitoring camera, etc.

The imaging apparatus 10 includes the zoom lens 1, a filter 2 disposed on the image side of the zoom lens 1, and an image sensor 3 disposed on the image side of the filter 2. The zoom lens 1 consists of a first lens-group front group G1, a moving lens group Gm, and an end lens group Ge. The first lens-group front group G1 consists of a first lens-group front group G1a, a first lens-group middle group G1b, and a first lens-group rear group G1c. The moving lens group Gm consists of second to fourth lens groups G2 to G4, and the end lens group Ge consists of a fifth lens group G5; however, this configuration is only one example, and the number of lens groups forming the moving lens group Gm is not limited to that in this example. It should be noted that each lens group is schematically shown in FIG. 14. The image sensor 3 converts an optical image formed by the zoom lens 1 into an electric signal. As the image sensor 3, a CCD or a CMOS may be used, for example. The image sensor 3 is disposed such that the imaging surface thereof is positioned in the same position as the image plane of the zoom lens 1.

The imaging apparatus 10 also includes a signal processing unit 5 that processes the signal outputted from the image sensor 3, a display unit 6 on which the image formed by the signal processing unit 5 is displayed, a zoom control unit 7 that controls magnification change of the zoom lens 1, and a focus control unit 8 that controls focusing of the zoom lens 1. It should be noted that, although one image sensor 3 is shown in FIG. 14, the imaging apparatus of the invention is not limited to the above-described example, and may be a so-called three-sensor imaging apparatus provided with three image sensors.

The present invention has been described with reference to the embodiments and the examples. However, the invention is not limited to the above-described embodiments and examples, and various modifications may be made to the invention. For example, lenses and the number of the lenses forming each lens group, the values of the radius of curvature, the surface distance, the refractive index, the Abbe number, and the aspheric coefficients of each lens are not limited to the values shown in the above-described examples.

What is claimed is:

1. A zoom lens comprising, in order from an object side:
    a first lens group that has a positive refractive power and is fixed relative to an image plane during magnification change;
    a moving lens group comprising at least two lens groups that are moved along an optical axis direction to change an air space therebetween during magnification change;
    a stop; and
    an end lens group that has a positive refractive power and is fixed relative to the image plane during magnification change,
    wherein the first lens group comprises, in order from the object side, a first lens-group front group that has a negative refractive power and is fixed relative to the image plane during focusing, a first lens-group middle group that has a positive refractive power and is moved along the optical axis direction during focusing, and a first lens-group rear group that has a positive refractive power and is fixed relative to the image plane during focusing,
    the first lens group, the moving lens group and the end lens group are the only lens groups with refractive power,
    the first lens-group middle group includes at least one aspheric lens that satisfies the condition expression (1) below, and at least one aspheric surface of the aspheric lens satisfies the condition expression (2) below:

$$0<[Xr(yr)-Xf(yf)]/fw \qquad (1),$$

and $$30<Das \cdot y/IH^2<100 \qquad (2),$$

where yf is a height on an object-side surface of the aspheric lens of a principal ray at a maximum image height at a wide-angle end, yr is a height on an image-side surface of the aspheric lens of the principal ray at the maximum image height at the wide-angle end, Xf(yf) is a positional difference in the optical axis direction between the object-side surface of the aspheric lens and a paraxial spherical surface of the object-side surface at the height yf, Xr(yr) is a positional difference in the optical axis direction between the image-side surface of the aspheric lens and a paraxial spherical surface of the image-side surface at the height yr, fw is a focal length of the entire system at the wide-angle end, Das is a distance along the optical axis from the aspheric surface of the aspheric lens to the aperture stop, y is a height on the aspheric surface of the aspheric lens of the principal ray at the maximum image height at the wide-angle end, and IH is the maximum image height, where a negative Xf(yf) indicates that the object-side surface of the aspheric lens at the height yf is on the object side of the paraxial spherical surface of the object-side surface, and a positive Xf(yf) indicates that the object-side surface of the aspheric lens at the height yf is on the image side of the paraxial spherical surface of the object-side surface, and where a negative Xr(yr) indicates that the image-side surface of the aspheric lens at the height yr is on the object side of the paraxial spherical surface of the image-side surface, and a positive Xr(yr) indicates that the image-side surface of the aspheric lens at the height yr is on the image side of the paraxial spherical surface of the image-side surface.

2. The zoom lens as claimed in claim 1, wherein the condition expression (3) below is satisfied:

$$Das/(IH \cdot Zr) < 2 \quad (3),$$

where Zr is a zoom ratio.

3. The zoom lens as claimed in claim 1, wherein the condition expression (4) below is satisfied:

$$3 < flb/fw < 30 \quad (4),$$

where flb is a focal length of the first lens-group middle group.

4. The zoom lens as claimed in claim 3, wherein the condition expression (4-1) below is satisfied:

$$5 < flb/fw < 15 \quad (4-1).$$

5. The zoom lens as claimed in claim 1, wherein the condition expression (5) below is satisfied:

$$2 < f1/fw < 15 \quad (5),$$

where f1 is a focal length of the first lens group.

6. The zoom lens as claimed in claim 5, wherein the condition expression (5-1) below is satisfied:

$$3 < f1/fw < 8 \quad (5-1).$$

7. The zoom lens as claimed in claim 1, wherein the first lens-group front group comprises, in order from the object side, a negative lens, and a cemented lens formed by a negative lens and a positive lens that are cemented together in this order from the object side, and the condition expressions (6) and (7) below are satisfied:

$$1.7 < Nd(1a-) \quad (6),$$

and $$vd(1a+) < 28 \quad (7),$$

where Nd(1a−) is an average refractive index with respect to the d-line of the negative lenses of the first lens-group front group, and vd(1a+) is an Abbe number with respect to the d-line of the positive lens of the first lens-group front group.

8. The zoom lens as claimed in claim 7, wherein the condition expression (6-1) below is satisfied:

$$1.75 < Nd(1a-) \quad (6-1).$$

9. The zoom lens as claimed in claim 7, wherein the condition expression (7-1) below is satisfied:

$$vd(1a+) < 25 \quad (7-1).$$

10. The zoom lens as claimed in claim 1, wherein the first lens-group middle group has a three-lens configuration comprising, in order from the object side, a positive lens, a negative lens, and a positive lens, or a four-lens configuration comprising, in order from the object side, two positive lenses, a negative lens, and a positive lens.

11. The zoom lens as claimed in claim 1, wherein the condition expression (8) below is satisfied:

$$-6 < f1a/fw < -3 \quad (8),$$

where f1a is a focal length of the first lens-group front group.

12. The zoom lens as claimed in claim 1, wherein, among the lens groups forming the moving lens group, each of first and second lens groups from the image side has a negative refractive power.

13. The zoom lens as claimed in claim 1, wherein the first lens-group middle group consists of two lens groups that are moved along the optical axis direction to change an air space therebetween during focusing.

14. The zoom lens as claimed in claim 1, wherein the first lens-group middle group includes at least one aspheric lens that satisfies the condition expression (1), and at least one aspheric surface of the aspheric lens satisfies the condition expression (2-1) below:

$$40 < Das \cdot y/IH^2 < 80 \quad (2-1).$$

15. The zoom lens as claimed in claim 1, wherein the first lens-group middle group includes at least one aspheric lens that satisfies the condition expression (1-1):

$$0.002 < [Xr(yr) - Xf(yf)]/fw < 0.05 \quad (1-1).$$

16. The zoom lens as claimed in claim 1, wherein the first lens-group middle group includes at least one aspheric lens that satisfies the condition expression (1-1) below, and at least one aspheric surface of the aspheric lens satisfies the condition expression (2-1) below:

$$0.002 < [Xr(yr) - Xf(yf)]/fw < 0.05 \quad (1-1),$$

and $$40 < Das \cdot y/IH^2 < 80 \quad (2-1).$$

17. An imaging apparatus comprising the zoom lens as claimed in claim 1.

* * * * *